(12) United States Patent
Newville

(10) Patent No.: US 12,704,217 B2
(45) Date of Patent: Aug. 11, 2026

(54) TELEVISION DISPLAY MOUNT WITH AN ADJUSTMENT MECHANISM FOR TILTING AND SWIVELING

(71) Applicant: Manehu Product Alliance, LLC, Carlsbad, CA (US)

(72) Inventor: Brian Newville, San Diego, CA (US)

(73) Assignee: Manehu Product Alliance, LLC, Carlsbad, CA (US)

( * ) Notice: Subject to any disclaimer, the term of this patent is extended or adjusted under 35 U.S.C. 154(b) by 77 days.

(21) Appl. No.: 18/396,546

(22) Filed: Dec. 26, 2023

(65) Prior Publication Data

US 2024/0209979 A1 Jun. 27, 2024

Related U.S. Application Data

(60) Provisional application No. 63/435,499, filed on Dec. 27, 2022.

(51) Int. Cl.
*F16M 11/10* (2006.01)
*F16M 11/08* (2006.01)
(Continued)

(52) U.S. Cl.
CPC ............. *F16M 11/10* (2013.01); *F16M 11/08* (2013.01); *F16M 11/2092* (2013.01); *F16M 13/02* (2013.01); *F16M 2200/063* (2013.01)

(58) Field of Classification Search
CPC ...... F16M 11/08; F16M 11/126; F16M 11/10; F16M 13/02
See application file for complete search history.

(56) References Cited

U.S. PATENT DOCUMENTS 2,090,439 A 8/1937 George
2,630,854 A 3/1953 Paul
(Continued)

FOREIGN PATENT DOCUMENTS

CA 3073367 A1 3/2019
CN 100411567 C 8/2008
(Continued)

OTHER PUBLICATIONS

Installation instructions for LINAK A/S Deskpower DB4/DL4 systems, Copyright 2009, 36 pages.
(Continued)

*Primary Examiner* — Bradley Duckworth
(74) *Attorney, Agent, or Firm* — Ashurst Perkins Coie US LLP

(57) ABSTRACT

A television tilt and swivel device includes a tilt bracket having an arched guide and a plurality of notches, a swivel bracket rotatably coupled to an extender assembly via a swivel rod configured to allow the swivel bracket to swivel in a generally horizontal direction relative to the extender assembly, wherein a lower portion of the swivel bracket is rotatably coupled to a lower portion of the tilt bracket, and wherein an upper portion of the swivel bracket is slidably coupled to the arched guide, a pull latch slidably coupled to the swivel bracket and having a tilt-fixing member configured to fit into one of the plurality of notches and prevent rotation of the tilt bracket, and a biasing element coupled to the swivel bracket and the pull latch, wherein the biasing element is configured to bias the tilt-fixing member toward the plurality of notches.

30 Claims, 11 Drawing Sheets

(51) Int. Cl.
*F16M 11/20* (2006.01)
*F16M 13/02* (2006.01)

(56) References Cited

U.S. PATENT DOCUMENTS 3,490,727 A 1/1970 Miller
4,076,351 A 2/1978 Wyant
4,082,244 A 4/1978 Groff
4,561,674 A 12/1985 Alessio
4,691,886 A 9/1987 Wendling et al.
4,779,922 A 10/1988 Cooper
4,781,375 A 11/1988 Nye
4,852,500 A 8/1989 Ryburg et al.
5,037,054 A 8/1991 Mcconnell
5,101,736 A 4/1992 Bommarito et al.
5,108,063 A 4/1992 Koerber et al.
5,135,191 A 8/1992 Schmuhl
5,224,677 A 7/1993 Close
5,299,993 A 4/1994 Habing
5,437,235 A 8/1995 Randolph
5,499,956 A 3/1996 Habing et al.
5,560,501 A 10/1996 Rupert
5,738,316 A 4/1998 Sweere et al.
5,743,503 A 4/1998 Voeller et al.
5,826,846 A 10/1998 Buccieri et al.
5,842,672 A 12/1998 Sweere et al.
5,845,587 A 12/1998 Ditonto
5,857,756 A 1/1999 Fehre
5,876,008 A 3/1999 Sweere et al.
5,909,934 A 6/1999 Mcgraw
5,988,076 A 11/1999 Vander
6,065,725 A 5/2000 Mason
6,065,909 A 5/2000 Cook
6,105,909 A 8/2000 Wirth et al.
6,296,408 B1 10/2001 Larkin et al.
6,419,196 B1 7/2002 Sweere et al.
6,505,988 B1 1/2003 Oddsen, Jr.
6,523,796 B2 2/2003 Abramowsky et al.
6,592,090 B1 7/2003 Li
6,695,274 B1 2/2004 Chiu
6,712,008 B1 3/2004 Habenicht et al.
6,889,404 B2 5/2005 Lu et al.
6,905,101 B1 6/2005 Dittmer
6,918,564 B2 7/2005 Yen et al.
6,983,917 B2 1/2006 Oddsen, Jr.
7,014,157 B2 3/2006 Oddsen
7,061,753 B2 6/2006 Michoux et al.
7,252,277 B2 8/2007 Sweere et al.
7,290,744 B2 11/2007 Baldasari
7,300,029 B2 11/2007 Petrick et al.
7,314,200 B2 1/2008 Bally et al.
7,345,870 B2 3/2008 Shin
7,395,996 B2 7/2008 Dittmer
7,398,950 B2 7/2008 Hung
7,431,254 B2 10/2008 Cheng
7,448,584 B2 11/2008 Chen et al.
7,494,099 B2 2/2009 Shin
7,546,745 B2 6/2009 Lee et al.
7,546,994 B2 6/2009 Altonji et al.
7,597,302 B2 10/2009 Lee et al.
7,640,866 B1 1/2010 Schermerhorn
7,663,868 B1 * 2/2010 Lam .................... H05K 5/0204 361/679.06
7,721,658 B2 5/2010 Seeley et al.
7,770,856 B2 8/2010 Depay
7,789,363 B2 9/2010 Duan
7,823,973 B2 11/2010 Dragusin
7,841,567 B2 11/2010 Wang
7,854,415 B2 12/2010 Holbrook et al.
7,866,622 B2 1/2011 Dittmer
7,950,613 B2 5/2011 Anderson et al.
8,006,440 B2 8/2011 Thomas et al.
8,011,632 B2 9/2011 Wang et al.
8,051,782 B2 11/2011 Nethken et al.
8,061,663 B2 11/2011 Wang et al.
8,074,950 B2 12/2011 Clary
8,094,438 B2 1/2012 Dittmer et al.
8,201,792 B2 6/2012 Yuan et al.
8,333,355 B2 12/2012 Stifal et al.
8,382,052 B1 2/2013 Mathieson et al.
8,418,861 B1 4/2013 Weaver et al.
8,724,037 B1 5/2014 Massey
8,740,164 B2 6/2014 Tachibana
8,746,635 B2 6/2014 Kim et al.
8,783,193 B2 7/2014 Scharing
8,864,092 B2 * 10/2014 Newville ............... F16M 13/02 361/679.01
8,893,628 B2 11/2014 Mckenzie et al.
8,960,632 B2 2/2015 Fallows
9,004,430 B2 4/2015 Conner
9,016,648 B2 4/2015 Smeenk
9,046,213 B2 6/2015 Huang
9,109,742 B2 * 8/2015 Smith .................... F16M 11/10
9,121,543 B2 9/2015 Dittmer et al.
9,167,894 B2 10/2015 Desroches et al.
9,265,346 B1 2/2016 Forney
9,433,293 B2 9/2016 Gross et al.
9,470,357 B2 10/2016 Hazzard et al.
9,554,644 B2 1/2017 Flaherty et al.
9,581,285 B2 2/2017 Ergun et al.
9,625,091 B1 4/2017 Massey
9,720,444 B2 8/2017 Holden
9,820,571 B2 11/2017 Lindblad
9,876,984 B2 1/2018 Massey
9,907,396 B1 3/2018 Labrosse et al.
9,921,726 B1 3/2018 Sculley et al.
9,999,557 B2 6/2018 Diaz-flores et al.
10,024,490 B2 * 7/2018 Lam ....................... F16M 13/02
10,038,952 B2 7/2018 Labrosse et al.
10,085,562 B1 10/2018 Labrosse et al.
10,104,963 B2 * 10/2018 Brandt ................. A47B 81/065
10,139,045 B1 11/2018 Keuter
10,159,336 B2 12/2018 Liao et al.
10,257,460 B2 4/2019 Massey
10,277,860 B2 4/2019 Massey
10,281,080 B1 * 5/2019 Massey .................. F16M 11/10
10,285,297 B2 5/2019 Bratcher et al.
10,376,158 B2 8/2019 Desroches
10,473,335 B2 11/2019 Nemes et al.
10,533,702 B2 * 1/2020 Kahn ................... A47B 97/001
D879,514 S 3/2020 Goldberg et al.
10,659,279 B2 5/2020 Chiu et al.
10,738,941 B2 * 8/2020 Newville ........... F16M 11/2092
D895,325 S 9/2020 Goldberg et al.
10,768,663 B2 9/2020 Carson et al.
10,827,829 B1 11/2020 Labrosse et al.
10,830,580 B2 11/2020 Hodowany
10,859,201 B2 * 12/2020 Newville ............ F16M 11/046
10,935,180 B1 3/2021 Massey
10,980,339 B2 4/2021 Game et al.
11,019,920 B2 6/2021 Liao et al.
11,033,107 B2 6/2021 Warren
11,051,611 B2 7/2021 Goldberg et al.
11,077,547 B2 8/2021 Gosselin
11,089,865 B2 8/2021 Knapp et al.
11,178,354 B2 11/2021 Massey
11,266,232 B2 3/2022 Knapp et al.
11,284,713 B2 3/2022 Hazzard et al.
11,287,080 B2 3/2022 Newville et al.
11,297,940 B2 4/2022 Horn et al.
11,346,493 B2 5/2022 Massey
11,346,496 B2 5/2022 Newville
11,357,323 B2 6/2022 Nourse
11,460,145 B2 10/2022 Massey
11,607,042 B1 3/2023 Massey
11,668,434 B2 6/2023 Newville et al.
11,692,666 B2 7/2023 Patell
11,774,033 B2 * 10/2023 Massey ................ F16M 11/048 248/231.91
11,781,702 B2 10/2023 Massey
11,781,703 B2 10/2023 Massey
11,802,653 B2 10/2023 Newville et al.
11,849,246 B1 12/2023 Massey
11,856,317 B2 12/2023 Massey

(56) References Cited

U.S. PATENT DOCUMENTS 11,959,583 B2 4/2024 Newville et al.
12,022,941 B2 7/2024 Hazzard et al.
12,143,748 B1 11/2024 Massey
12,146,606 B2 * 11/2024 Liu ........................ F16M 13/02
12,152,725 B2 11/2024 Newville et al.
12,167,163 B1 12/2024 Massey
12,295,493 B2 5/2025 Newville et al.
12,316,996 B1 5/2025 Massey
12,372,194 B2 7/2025 Newville et al.
12,388,949 B1 8/2025 Massey
2002/0020329 A1 2/2002 Kowalski
2002/0033436 A1 3/2002 Peng et al.
2002/0043978 A1 4/2002 Mcdonald
2002/0100851 A1 8/2002 Abramowsky et al.
2002/0179791 A1 12/2002 Kwon
2004/0084587 A1 5/2004 Oddsen
2005/0010911 A1 1/2005 Kim et al.
2005/0022699 A1 2/2005 Goza
2005/0110911 A1 5/2005 Childrey et al.
2005/0152102 A1 7/2005 Shin
2005/0204645 A1 9/2005 Bachinski et al.
2005/0217540 A1 10/2005 Novak
2005/0236543 A1 10/2005 Oneil
2006/0065166 A1 3/2006 Chi et al.
2006/0070210 A1 4/2006 Amdahl et al.
2006/0077622 A1 4/2006 Keely et al.
2006/0102819 A1 5/2006 Li
2006/0284037 A1 12/2006 Dittmer et al.
2007/0007412 A1 1/2007 Wang
2007/0007413 A1 1/2007 Jung et al.
2007/0023599 A1 2/2007 Fedewa
2007/0030405 A1 2/2007 Childrey et al.
2007/0040084 A1 2/2007 Sturman et al.
2007/0205340 A1 9/2007 Jung
2007/0221807 A1 9/2007 Park
2007/0252056 A1 11/2007 Novin
2008/0078906 A1 4/2008 Hung
2008/0237424 A1 10/2008 Clary
2009/0032656 A1 2/2009 Oh
2009/0034178 A1 2/2009 Le
2009/0050757 A1 2/2009 Oh et al.
2009/0050763 A1 2/2009 Dittmer
2009/0108158 A1 4/2009 Kim et al.
2009/0166501 A1 7/2009 Wang et al.
2009/0179133 A1 7/2009 Gan et al.
2009/0206221 A1 8/2009 Timm et al.
2009/0212669 A1 8/2009 Robert-reitman et al.
2010/0006725 A1 1/2010 Kim et al.
2010/0024691 A1 2/2010 Weber
2010/0091438 A1 4/2010 Dittmer
2010/0123053 A1 5/2010 Wang
2010/0123059 A1 5/2010 Saez
2010/0149736 A1 6/2010 Dittmer et al.
2010/0155558 A1 6/2010 Zhang et al.
2010/0171013 A1 7/2010 Anderson et al.
2010/0207006 A1 8/2010 Kim
2011/0043978 A1 2/2011 Bremmon et al.
2011/0108688 A1 5/2011 Parruck
2011/0198460 A1 8/2011 Stifal et al.
2011/0234926 A1 9/2011 Smith
2012/0032062 A1 2/2012 Newville
2012/0033371 A1 2/2012 Pankros et al.
2012/0061543 A1 * 3/2012 Juan ....................... F16M 13/02 248/291.1
2012/0167486 A1 7/2012 Lee
2013/0032682 A1 2/2013 Bell
2013/0082156 A1 4/2013 Conner
2013/0176667 A1 7/2013 Kulkarni et al.
2013/0187019 A1 7/2013 Dittmer et al.
2013/0199420 A1 8/2013 Hjelm
2013/0221174 A1 8/2013 Sapper et al.
2013/0320163 A1 12/2013 Wong
2014/0077050 A1 3/2014 Huang
2014/0208985 A1 7/2014 Desroches et al.
2014/0211100 A1 7/2014 Massey
2014/0311050 A1 10/2014 Kincaid et al.
2015/0053830 A1 2/2015 Kuo et al.
2015/0138304 A1 5/2015 Mcardell et al.
2015/0245707 A1 9/2015 Saab
2015/0277214 A1 10/2015 Schuh
2016/0120309 A1 5/2016 Brandt et al.
2016/0270528 A1 9/2016 Scharing
2017/0105529 A1 4/2017 Kozlowski et al.
2017/0143117 A1 5/2017 Koulizakis
2018/0054156 A1 2/2018 Lokey
2018/0131895 A1 5/2018 Massey
2018/0310459 A1 11/2018 Blunier
2018/0352189 A1 12/2018 Massey
2019/0029414 A1 1/2019 Nourse et al.
2019/0059574 A1 2/2019 Paul et al.
2019/0072231 A1 3/2019 Newville et al.
2019/0309895 A1 10/2019 Newville
2019/0335135 A1 10/2019 Massey
2019/0343272 A1 11/2019 Smith et al.
2019/0374025 A1 12/2019 Bowman
2020/0022492 A1 1/2020 Patrick et al.
2020/0049304 A1 2/2020 Hung
2020/0355319 A1 11/2020 Newville et al.
2020/0390009 A1 12/2020 Whitehead et al.
2020/0408353 A1 12/2020 Massey
2021/0190259 A1 6/2021 Newville
2021/0247019 A1 * 8/2021 Newville ............. F16M 11/121
2022/0150441 A1 5/2022 Massey
2022/0178493 A1 6/2022 Seol et al.
2022/0252209 A1 8/2022 Newville
2022/0354253 A1 * 11/2022 Warren .............. F16M 11/2092
2022/0356981 A1 11/2022 Del Real Pena et al.
2022/0356982 A1 11/2022 Newville et al.
2023/0016050 A1 1/2023 Newville et al.
2023/0016449 A1 1/2023 Newville et al.
2024/0027020 A1 1/2024 Newville et al.
2024/0125425 A1 4/2024 Newville et al.
2024/0218966 A1 * 7/2024 Xu ...................... F16M 11/105

FOREIGN PATENT DOCUMENTS

CN 103371623 A 10/2013
CN 104214491 A 12/2014
CN 104424849 A 3/2015
CN 106704779 A 5/2017
CN 109605346 A 4/2019
CN 109906432 A 6/2019
CN 111031859 A 4/2020
CN 109605346 B 8/2020
CN 211232332 U 8/2020
EP 3662786 A1 6/2020
GB 2222939 A 3/1990
GB 2579974 A 7/2020
JP 2009014047 A 1/2009
KR 100705069 B1 4/2007
KR 20070081731 A 8/2007
WO 2018098022 A1 5/2018
WO 2019043670 A1 3/2019
WO 2019183822 A1 10/2019
WO 2021006987 A1 1/2021
WO 2021127552 A1 6/2021

OTHER PUBLICATIONS

LINAK, Product Data Sheet, DP Desk Panel, Copyright 2007, 4 pages.
LINAK, Product Data Sheet, WDPL Display Panel, Copyright 2007, 4 pages.
MantelMount MM750 Pro Above Fireplace Pull Down TV Mount, accessed Dec. 3, 2020 from https://www.mantelmount.com/products/mm750-pro-pull-down-tv-mount, 6 pages.
MantelMount RB100 Recess Box—MantelMount Pull Down TV Mount Accessory, accessed Dec. 3, 2020 from https://www.mantelmount.com/products/mantelmount-rb100-recess-box, 6 pages.
Screenshot of LINAK Motorized Adjustable Standing Desks (Copyright 2003-2008), available at https://web.archive.org/web/

(56) References Cited

OTHER PUBLICATIONS

20081103062318/http://www.deskline.linak.com/Applications/?id2=113 (visited Jan. 8, 2025); 1 page.

* cited by examiner

TELEVISION DISPLAY MOUNT WITH AN ADJUSTMENT MECHANISM FOR TILTING AND SWIVELING

CROSS-REFERENCE TO RELATED APPLICATION

The present application claims the benefit of U.S. Provisional Patent Application No. 63/435,499, filed Dec. 27, 2022, the disclosure of which is incorporated herein by reference in its entirety.

TECHNICAL FIELD

This present disclosure relates to television display mounts with television tilt and swivel devices and adjustment mechanisms.

BACKGROUND

Televisions are often mounted directly to walls using wall mounts. Conventional television wall mounts do not provide controlled locking and unlocking tilting and swiveling of televisions. For example, users must often use tools to unscrew and screw locking bolt(s) of mounts located behind a television to adjust television tilt. Unfortunately, locking bolt(s) are loosed and tightened many times to set television tilt for different viewing situations. Additionally, it is often difficult to access the locking bolt(s) because conventional locking bolt(s) are located behind the television and often closer to the top of the television rather than the bottom of the television. It may be further challenging to reach locking bolt(s) when the backside of the television is positioned close to a wall, the mount is positioned at a high location, or the mount is installed above an object, such as mantel. If a user uses his/her hands to unscrew and screw locking bolt(s), the user's hands may be pinched between moving components of the mount.

BRIEF SUMMARY OF TECHNOLOGY

At least some embodiments are directed to mounts capable of raising, lowering, and/or rotating (e.g., tilting, swiveling) objects, such as a television. The mounted objects can be tilted (e.g., rotated about a generally horizontal axis) to various predefined, discrete tilt angles, or swiveled (e.g., rotated about a generally vertical axis) to accommodate different viewing positions. Pivots, swivels (e.g., swivel brackets), joints, auto-positioning, motors, actuators, or the like can be used to provide the desired motion. A user can conveniently make position adjustments (e.g., tilt adjustments, swivel adjustments, etc.) without standing behind, or reaching directly behind, the television. For example, the user can use one or two hands to adjust tilt of the television while standing in front of the television.

In some embodiments, an adjustment mechanism can include one or more positioning features (e.g., teeth, notches, etc.) that define discrete tilt angles and keep the mounted objects at those tilt angles. When a user wishes to change the tilt angle, the user can pull on a handle to decouple (i.e., disengage) locking members (e.g., tabs) from the notches, tilt the mounted object to a desired tilt angle, and then release the handle such that one or more biasing elements (e.g., springs) bias the locking members to a locked position. The adjustment mechanism can have multiple members that engage the accurately spaced apart positioning features for locking the mounted object at the desired tilt angle.

In some embodiments, a display mount has an automatically movable television mounting portion. In other embodiments, the television mounting portion is moved manually. The television mounting portion can be rotated about an axis (e.g., vertical, horizontal, etc.) to an angle equal to or greater than 1, degree, 5 degrees, 9 degrees, 10 degrees, 20 degrees, 30 degrees, 40 degrees, 50 degrees, 60 degrees, 80 degrees, 120 degrees, 180 degrees, 240 degrees, or other desired angles. The television can be kept at an orientation (e.g., parallel to a wall orientation) while being translated. In some embodiments, the display mount provides up to 10 degrees of tilt and 80 degrees of swivel. The display mount can include an adjustment mechanism that defines predefined tilt positions (e.g., a predefined tilt position at each degree of tilt, at every two degrees of tilt, etc.).

In some embodiments, an adjustment mechanism can be installed on conventional mounts. The adjustment mechanism can include a tilt mechanism and a swiveling assembly. The tilt mechanism can be manually unlocked and locked. When in an unlocked configuration or state, the adjustment mechanism allows the user to manually adjust the tilt of the television. When the television is at the desired orientation, the operator can allow the tilt mechanism to return to a locked configuration or state. This allows the user to repeatedly adjust the orientation of the television. The swivel assembly is configured to allow the user to manually push/pull on either side of the TV to adjust the swivel position. Advantageously, the adjustment mechanism can be installed on various types of mount arms. In some embodiments, one or more adapters can be used to couple the adjustment mechanism to a conventional mount arm or mount component. This allows users to install the adjustment mechanism on different types of conventional mount arms.

In some embodiments, a television tilt device comprises a tilt latch mechanism, a handle, and a linkage. The tilt latch mechanism is couplable to a television mounting bracket and a wall mount. The linkage couples the handle to the tilt latch mechanism such that the handle is located below the television mounting bracket. The handle is movable from a locked position to an unlocked position to unlock the latching mechanism so as to allow the handle to be moved toward and away from the wall to tilt the television mounting bracket. The handle can be spaced apart (e.g., behind and below) from a bottom of the television.

The linkage is configured to extend and contract to position the handle (e.g., an elongated padded handle, a pair of handgrips, etc.) lower than the television. The handle can be oriented to be horizontal and/or generally parallel to a bottom edge of the television. The latching mechanism can include a tilt bracket fixedly attached to the television mounting bracket, a mount bracket coupled to the wall mount, and a pull latch slidably coupled to the mount bracket and configured to engage the tilt bracket to, for example, lock the latching mechanism, disengage the tilt bracket to unlock the latching mechanism, etc. The mount bracket can include a plate coupled to both the wall mount and television mounting bracket. In some embodiments, the mount bracket includes a swivel device connecting the television mounting bracket to the wall mount. The mount bracket includes swivel brackets, swivel rod or pivot, or the like.

The tilt latch mechanism is movable between multiple states or configuration (e.g., a locked configuration, an unlocked configuration, etc.) and includes one or more one or more springs that bias the tilt latch mechanism toward the locked configuration. The handle is manually movable to cause the tilt latch mechanism to change between the locked configuration and the unlocked configuration. The tilt latch mechanism is lockable at a plurality of discrete positions for holding the television mounting bracket at respective orientation (e.g., tilt angle, swivel angle, etc.).

BRIEF DESCRIPTION OF THE DRAWINGS

In the drawings, identical reference numbers identify similar elements or acts.

Figure 1:
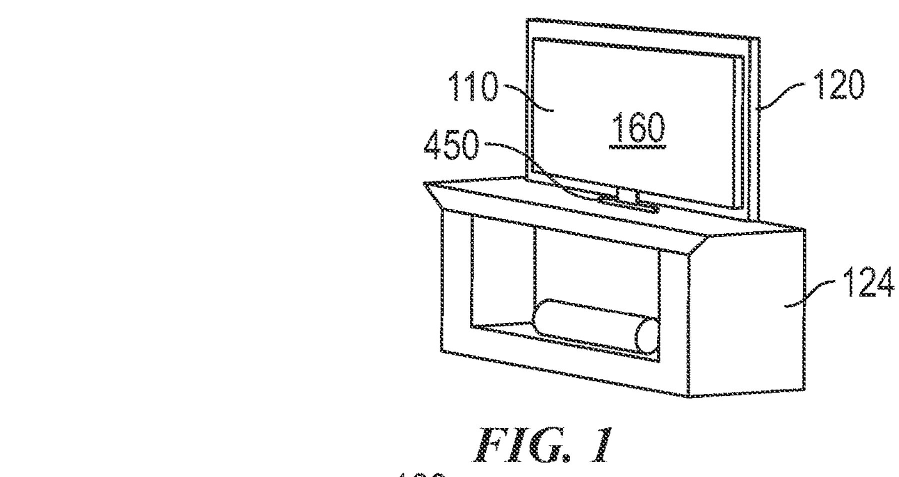
FIG. 1 is a pictorial view of a television installed above a fireplace.

A person skilled in the relevant art will understand that the features shown in the drawings are for purposes of illustrations, and variations, including different and/or additional features and arrangements thereof, are possible.

DETAILED DESCRIPTION

I. Overview

Figure 2:
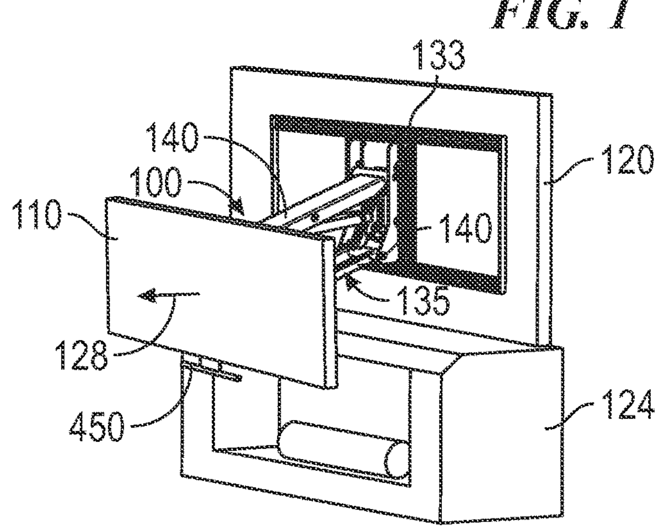
FIG. 2 shows the television in a lowered upright orientation.
Figure 3:
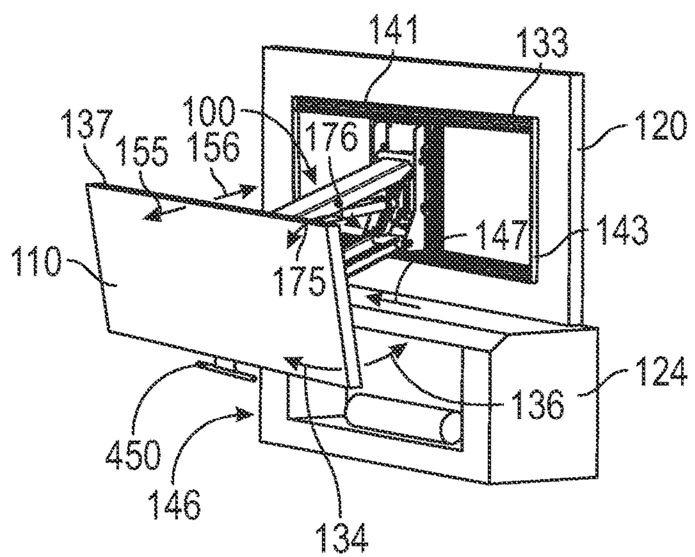
FIG. 3 shows the television in a lowered downwardly tilted orientation.

FIG. 1 shows a display or television 110 ("television 110") in a raised rearward or stowed position and very close to a wall 120. FIG. 2 shows the television 110 in a lowered forward position. FIG. 3 shows the television 110 in a lowered and forward/downward-tilted position in front of the fireplace. A multidirectional display mount 100 ("display mount 100," sometimes also referred to herein as a "mount device" or a "television mount device"), which is partially visible in FIGS. 2 and 3, can be hidden from view of someone in front of the stowed television 110 for an aesthetically pleasing appearance. The display mount 100 allows the television 110 to be moved in different directions while avoiding contacting obstacles. For example, the user can manually squeeze or move a handle 450 to unlock the display mount 100. The television 110 can then be swiveled about a vertical axis of rotation and/or tilted about a horizontal axis of rotation. A user can conveniently make position adjustments while standing in front the television 110. For example, the user can use one or two hands to grip and move the handle 450 to adjust tilt of the television 110 when the television 110 is close to the wall 120 (e.g., when positioned at a fully raised position), positioned at a high location along the wall 120, or positioned directly above an object, such as a mantelshelf 124 (sometimes referred to herein as a "mantel 124").

Referring to FIG. 1, the bottom of the television 110 and handle 450 can be avoid striking the top of the mantelshelf 124 when lowered or raised. After the bottom of the television 110 has moved forwardly past the mantelshelf 124, the television 110 can be pulled downwardly past the top surface of the mantelshelf 124. A user can push/pull downwardly on the handle 450 (FIGS. 2 and 3) to unlock an adjustment mechanism (e.g., a television tilt device, a television swivel device, or a television tilt and swivel device) when the television 110 is at a raised position, lowered position, or intermediate position. Once unlocked, the user can tilt the television forward and rearwardly, as indicated by arrows 175, 176 of FIG. 3. Once the television 110 is at a desired orientation, the user can release the handle 450 to allow the adjustment mechanism to return to a locked state. In some embodiments, a user can walk up to the front of the television 110, squeeze or grip the handle 450, and push the handle 450 forward and backward to tilt the television 110 to the desired tilt angle. The user can then release the handle 450 to lock the television 110 at the desired tilt angle. The tilt angle can be regularly and easily adjusted for different viewing situations. Advantageously, tilt of the television 100 can be quickly and easily performed without using separate tools, without accessing components (e.g., locking bolts) of the conventional mounts near the top of the backsides of televisions, etc. In some embodiments, the adjustment mechanism can include an integrated swivel assembly to allow the user to swivel (e.g., manually or automatically swivel) the television 110, as indicated by arrows 134, 136. In this manner, the television 110 can be brought down and in front of the mantelshelf 124 (or any other protruding object below the display mount 100) and positioned at a desired orientation. Details of components and operation of the display mount 100 are discussed in connection with FIGS. 1-3.

FIG. 1 shows the stowed television 110 positioned above a fireplace to avoid occupying usable space and to reduce the likelihood of unwanted inadvertent contact by people moving about the room. If the fireplace includes a hearth, it may be difficult for small children, or other individuals, to inadvertently contact the stowed television 110. In some embodiments, the television 110 can be generally flat against or parallel to the wall 120 (e.g., parallel to the wall 120) to minimize or limit unwanted reflections from a screen 160 that may be directed to someone sitting on furniture in front of the television 110, especially when the television 110 is turned off. The bottom of the television 110 can be held directly above the mantelshelf 124. In some embodiments, the handle 450 can be positioned below the television 110 for convenient accessibility. The user can actuate the handle 450 to adjust the angular position of the stowed television 110. In some embodiments, the handle 450 is retracted to be hidden from viewing.

FIG. 2 shows the lowered television 110 after a user has pulled, as indicated by arrow 128, the television 110 away from the wall 120. For example, a user can grip and pull the television 110 horizontally and then downwardly away from the wall 120 while the mount device 100 holds the television 110 in an upright orientation. In some embodiments, the television 110 can be held at the same vertical orientation while being moved away from the wall 120. The television 110 can be moved to a desired vertical position prior to angular adjustment (e.g., adjusting tilt/swivel). The user can actuate the handle 450 to unlock and adjust the mechanism to simultaneously move the television 110 away from the wall 120 and adjust tilt and swivel of the television 110. The adjustment mechanism can include, without limitation, one or more notches, gear teeth, pins in holes, spring-loaded friction pads, or other positioning features for limiting or stopping movement. Accordingly, the user can sequentially or concurrently adjust the vertical height and orientation of the television 110.

The mount device 100 can include a wall mounting bracket or portion 133 and an arm or extender assembly 135 rotatably coupled to the wall mounting portion 133. The extender assembly 135 can be a wall mount that includes one or more articulating linkages or arms 140 that allow movement of the television 110. In some embodiments, including the illustrated embodiment, the extender assembly 135 includes a pair of articulating arms 140. In some embodiments, the extender assembly 135 is a linkage assembly (e.g., a four-bar linkage assembly, a five-bar linkage assembly, etc.), an expandable arm, or an assembly configured to provide desired motion of the television 110. U.S. Pat. Nos. 8,724,037; 8,864,092; 8,724,037; 9,625,091; 9,876,984; 10,257,460; 10,277,860 disclose linkage assemblies, rotatable arms, and other extender assemblies. The components, configuration, and range of motion of the extender assembly 135 can be selected based on the installation location, nearby objects to be avoided, desired viewing positions of the television, and/or target range of motion. Components of the mount device 100 can be motorized or manually operated. For example, the adjustment mechanism is manually operated and the extender assembly 135 is motorized. In some embodiments, the extender assembly 135 is motorized and the adjusting mechanism is motorized. FIG. 3 shows the television 110 after it has been moved to a lowered forward and tilted position. The display mount 100 may include a dynamic component in the form of an adjustment mechanism 146 configured to provide, for example, forward/rearward tilt (indicated by arrows 175, 176) and side-to-side swiveling (indicated by arrows 134, 136). Example adjustment mechanisms are discussed in connection with FIGS. 4-17.

Referring to FIGS. 2-3, the display mount 100 can include a vertical positioner or counterbalance mechanism 147 ("counterbalance mechanism 147"). The counterbalance mechanism 147 can counterbalance the weight of the television 110 to hold the television 110 and also allow raising/lowering of the television 110 with a minimal amount of applied force. The television 110 can remain spaced apart from the mantel 124. A top 137 of the television 110 (e.g., when in a lowermost position) can be lower than most or all of the mounting portion 133. The screen of the television 110 can be substantially perpendicular to a sitting viewer's line of sight, substantially parallel to a front surface of the wall 120, or at another desired orientation. For example, the top 137 of the lowered television 110 can be lower than a top 141 and/or a bottom 143 of the mounting portion 133. One or more adjustable or fixed stops can be used to prevent contact with the mantel 124 or to achieve repeatable positioning, or both. The stops can be incorporated into components of the display mount 100, and the configuration of the actuation mechanism 146 can be selected based on a target motion, range of motion, and/or number of degrees of freedom.

The lowered downward-tilted television 110 is especially well suited for viewing when someone is positioned near the television 110, for example, to play a game system (e.g., Xbox 360, PlayStation®, PlayStation® 2, PlayStation® 3, Nintendo game system, or the like), or to provide convenient viewing while sitting, for example, on the floor, a gaming chair, or furniture. The television 110 can be tilted to an upright orientation to provide viewing when viewing from a sofa, chair, etc. The display mount 100 allows the television 110 to be spaced apart (e.g., horizontally away) from the fireplace to prevent excess heating of the television 110 when the fireplace place is used. The television 110 can be returned to the stowed position of FIG. 1.

Referring now to FIGS. 1-3, embodiments of the mount device 100 can include one or more pivots, swivels (e.g., swivel brackets, auto-straightening devices, etc.), joints, stops, locks, brakes, friction elements, or the like. The configuration of the mount device 100 can be selected for manual or automated operation. For two-step positioning, the television 110 can be moved (e.g., manually or automatically moved) away from the stowed raised position (FIG. 1) to a lowered forward position (FIG. 2). The television 110 can then be pivoted (e.g., manually or automatically moved) to a tilted/swiveled position (FIG. 3). The television 110 can be kept spaced apart from the mantelshelf 124. In some embodiments, the mount device 100 has a mechanical or electrical release (e.g., a user-assist device or mechanism) that allows the television 110 to be rotated (e.g., tilted, swiveled, etc.) after the television 110 has moved, for example, to a preset position, a distance from the wall, or a distance from another reference point. This prevents contact between the television and the mantelshelf 124. Details of the mount device 100 are discussed in connection with FIGS. 4-17.

With continued reference to FIGS. 1-3, the mount device 100 can be coupled to a wide range of different types of support structures, such as walls of a dwelling (e.g., a house, an apartment, etc.), an office, a lobby, a bar (e.g., sports bar), a restaurant, or the like and can be mounted to vertical walls or non-vertical walls, including, without limitation, angled walls, non-planar walls, or other structures sturdy enough to handle the load of the mount device 100 and any attached object(s). The mounting portion 133 can be configured to be mounted to a surface of the wall 120. For example, as discussed in more detail below, a substantial portion of the mount device 100 can be housed within a recessed box or housing located within a wall when in a stowed configuration. In some embodiments, the mount device 100 can collapse into the recessed box or housing such that a majority of, or all of, the moving components of the mount device 100 are within the wall. In some embodiments, the television and/or television bracket can generally be flush with an exterior surface of the wall. In some embodiments, the mounting portion 133 can be configured to be positioned at least partially within the wall.

In some motorized embodiments, the mount device 100 can include motorized swivel mechanisms, swivel/tilting mechanisms, drive motors, or the like to provide motorized positioning and can include one or more controllers. The positioning capabilities of the mount device 100 can be selected based on target viewing positions. In some manually operated embodiments, a user can conveniently grasp and pull the television 110 away from the wall 120. The bottom of the television 110 and handle 450 can automatically swing away from the wall 120 to keep the television 110 and handle 450 from striking the top of a mantel 124. After the bottom of the television 110 and the handle 450 have moved forwardly past the mantel 124, the television 110 can be lowered downwardly past the top surface of the mantel 124. In this manner, the television 110 can be manually brought down and in front of the mantel 124 or any other protruding object below the mounting portion 133. In some embodiments, the mount device 100 can have both a manual mode for manually moving the television and a motorized mode for robotically moving the television.

The mount device 100 can include one or more features that prevent contact with the mantel 124 or provide repeatable positioning, or both. The features can include fixed stops, friction elements, motion inhibitors, or other elements that can be incorporated into the mount device 100. The mount device 100 can also include one or more biasing mechanisms, counterbalancing mechanisms, drive trains, pulley systems, gear systems, motors, indexers, sprockets, belts, chains, or combinations thereof. In some embodiments, the mount device 100 can have four, five, or six degrees of freedom, thereby allowing a user to precisely position a television. The number and configuration of components of the mount device 100 can be selected based on the degrees of freedom and range of motion.

The television 110 can be, without limitation, a liquid crystal display (LCD) television, a plasma television, a light emitting diode (LED) television, or other type of flat-screen television, as well as other types of wall-mountable televisions. The weights of such televisions are often in a range of about 20 pounds to about 110 pounds and often have a maximum thickness of less than about 5 inches. In some embodiments, the television weighs at least about 20 pounds, 40 pounds, 60 pounds etc. The mount device 100 holds the television 110 in an upright orientation while the television 110 is pulled downwardly. Advantageously, large screen televisions have a screen with a length (measured diagonally) equal to or greater than about 30 inches, 50 inches, 60 inches, 70 inches, 80 inches, 85 inches, etc., and can hide the entire mount device 100, as shown in FIG. 1. The mount device 100 can also hold small or medium screen televisions. Other types of electronic displays (e.g., monitors) or objects can be carried by the mount device 100. Exemplary mountable objects include, but are not limited to, screens suitable for use with front projectors, boards (e.g., a chalk board, a dry erase board, etc.), containers (e.g., a basket, a bin, etc.), or the like.

Figure 4:
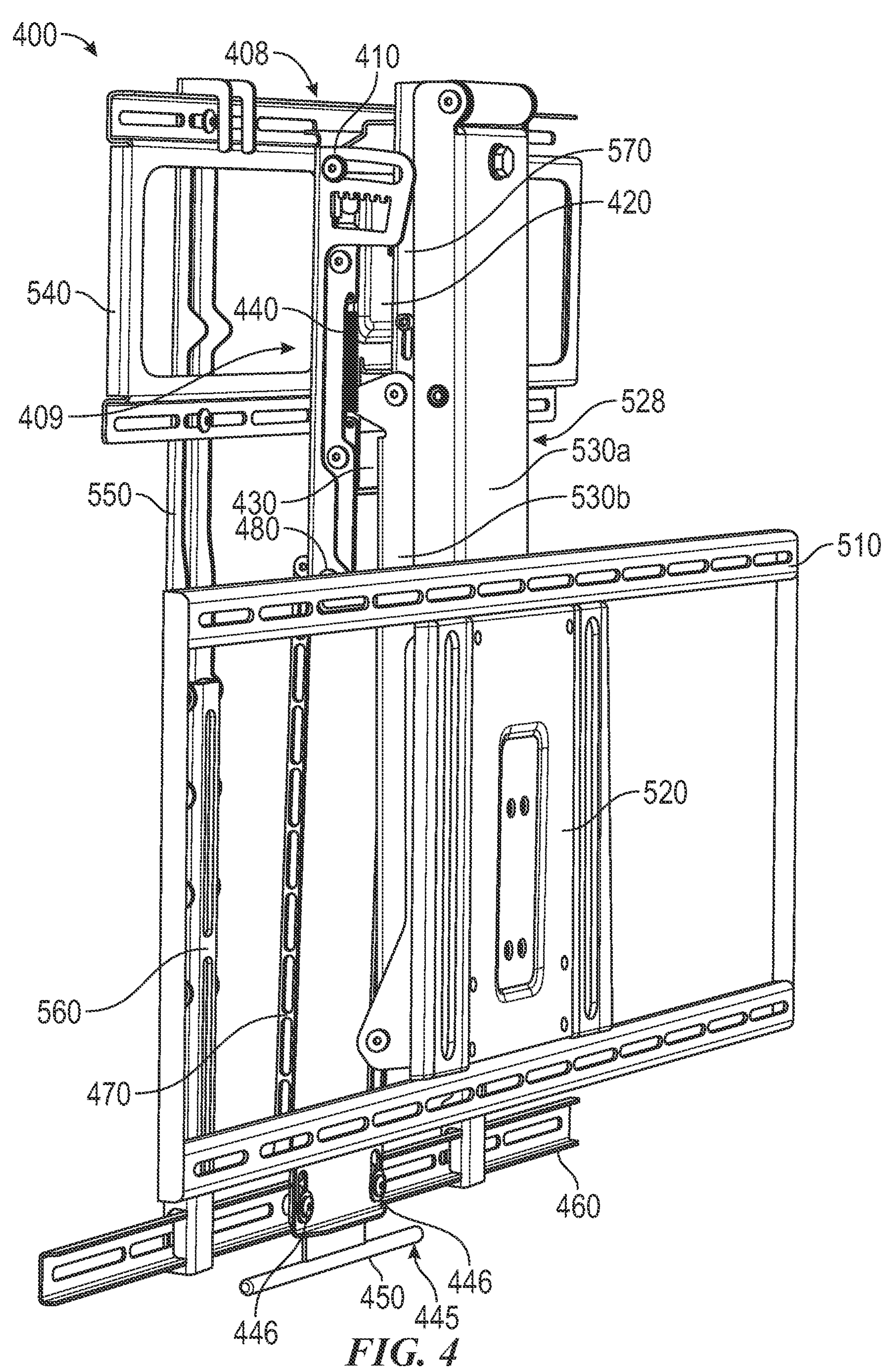
FIG. 4 is a rear isometric view of a display mount in a stowed collapsed configuration in accordance with an embodiment of the technology.

FIG. 4 is a rear isometric view of a display mount 400 in a stowed collapsed position in accordance with an embodiment of the technology. The description of the display mount 100 of FIGS. 1-3 applies equally to the display mount 400 unless indicated otherwise. The display mount 400 includes a television tilt and swivel device or adjustment mechanism 408 ("adjustment mechanism 408") configured to set the orientation (e.g., tilt, swivel, angular position, etc.) of the television. The adjustment mechanism 408 can be coupled to a wall mount or an extender assembly 528 and includes a tilt latch mechanism 409 and a linkage or an actuator assembly 445 ("linkage 445"). The tilt latch mechanism 409 can be selectively locked an unlocked and can include a tilt mechanism or bracket 410 ("tilt bracket 410") and a swivel bracket 420. When a television is mounted to a television mounting bracket 540, the tilt bracket 410 and swivel device 420 can be hidden behind the television. This can provide an aesthetically appealing appearance. The actuator assembly 445 can extend downwardly such that the handle 450 is positioned near or below the bottom edge of the television. A user can conveniently grip and actuate the handle 450 to unlock the tilting bracket 410 and/or swiveling device 420. In some embodiments, the actuator assembly 445 can be biased to automatically lock the adjustment mechanism 408 and/or swivel device 420 when the handle 450 is released. This allows the user to selectively lock and unlock the adjustment mechanism 408.

The actuator assembly 445 can include a pull latch 430, one or more biasing elements (e.g., springs) 440, the handle 450, tilt rods 470, and pivots or pivot pins 480 ("pivot pins 480"). The tilt bracket 410 can be fixedly attached to a television mounting bracket 540 such that when the tilting bracket 410 is moved to a tilted configuration, the television mounting bracket 540 is also tilted by the same tilt angle. The television mounting bracket 540 can include one or more plates, plate/bracket connectors 550, rails 460 (e.g., horizontal rails, vertical rails, etc.), fasteners, or the like.

The rear side of the adjustment mechanism 408 is coupled to an extender assembly 528, which includes a vertical member 570, a top articulating arm 530A, and a bottom articulating arm 530B. The extender assembly 528 can be coupled to a wall bracket 510 via a center plate 520. The wall bracket 510 is configured to be fixedly attached to a wall (e.g., as seen in FIGS. 1-3). The extender assembly 528 can be non-motorized (e.g., a manually operated four-bar linkage, five-bar linkage, etc.), motorized, etc.

Figures 5A, 5B:
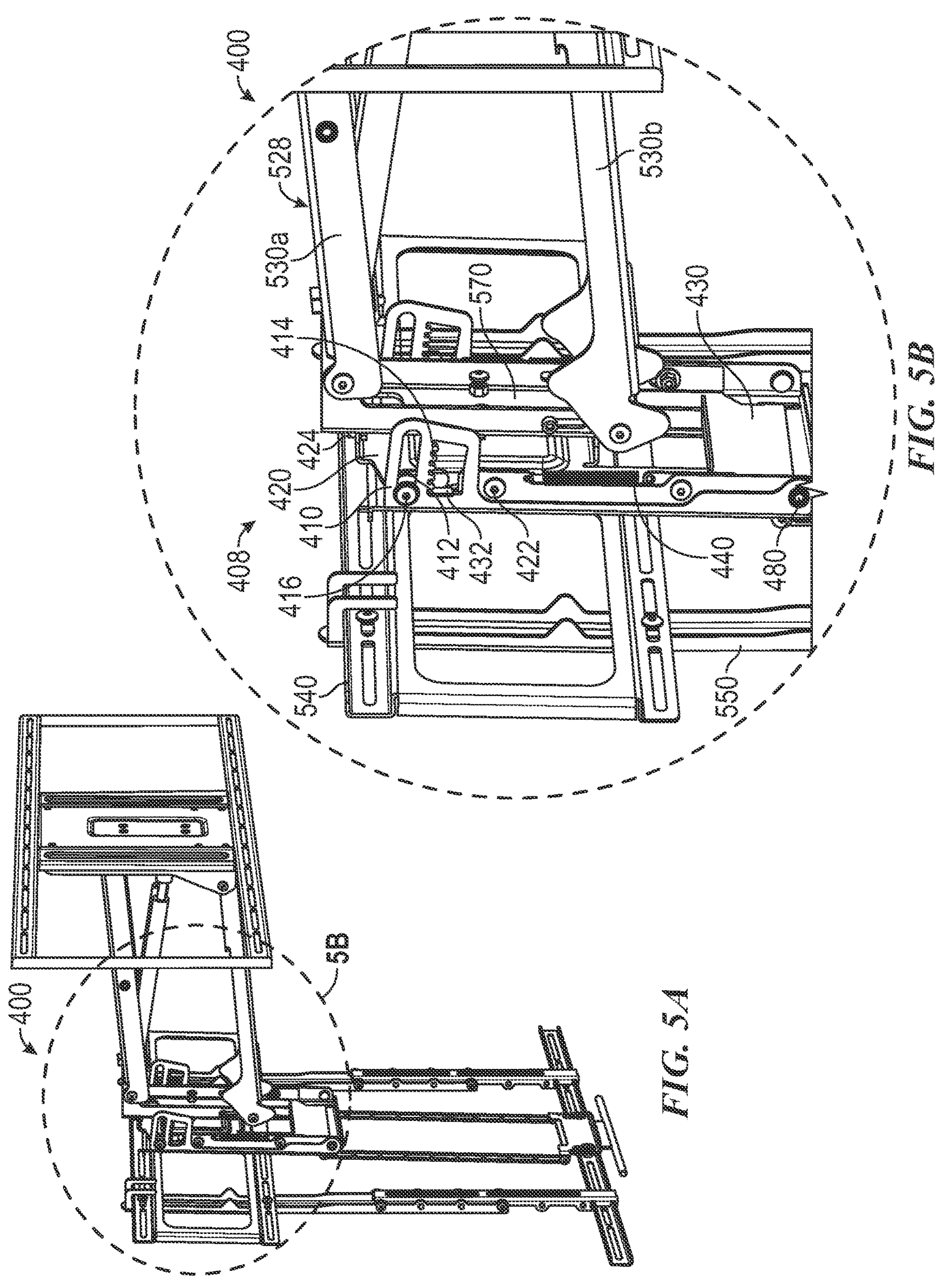
FIG. 5A is a rear isometric view of the display mount in a lowered position.
FIG. 5B is a detailed view of an adjustment mechanism in an upright orientation.
Figures 6A, 6B:
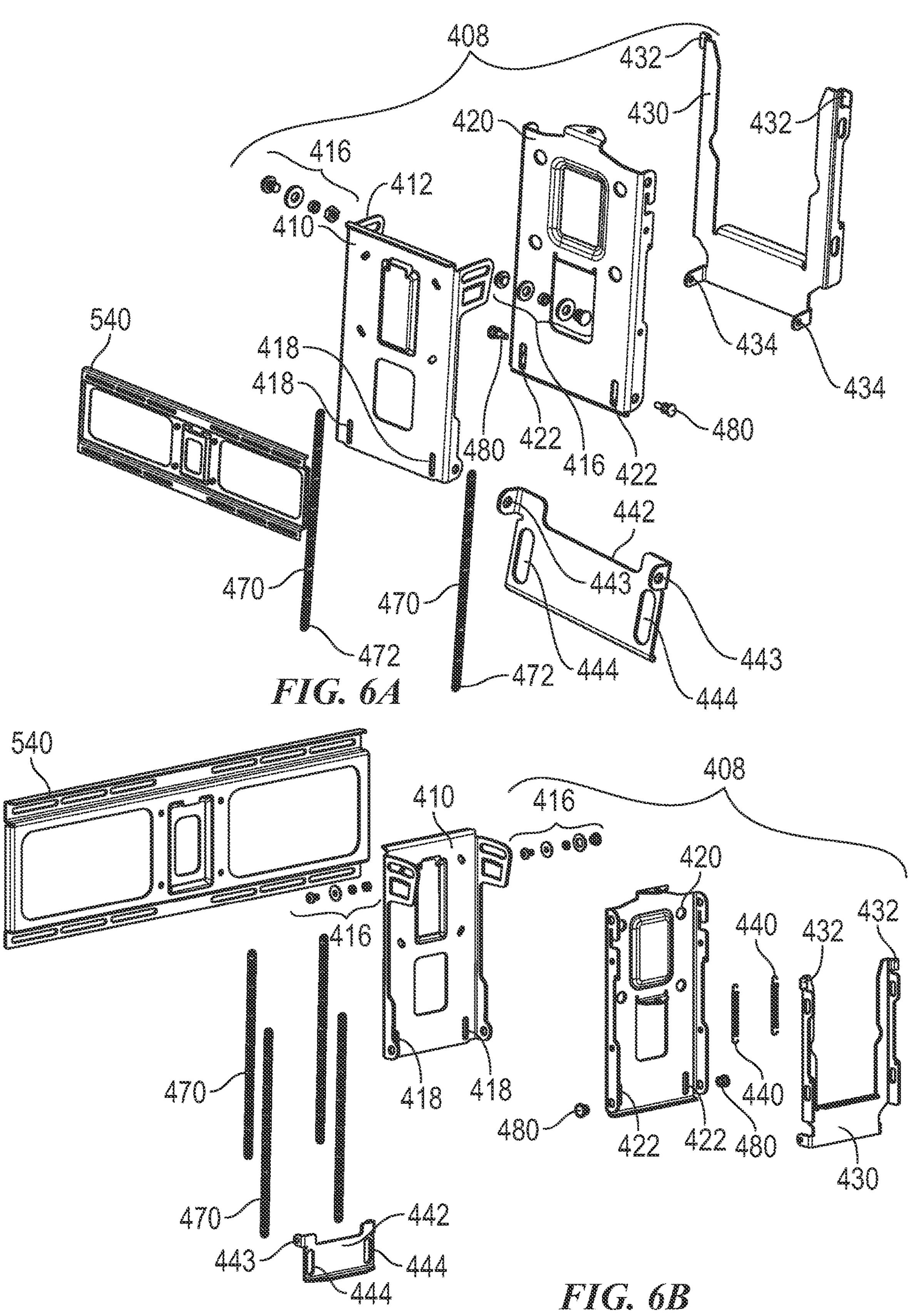
FIGS. 6A and 6B are front and rear exploded views of an adjustment mechanism in accordance with an embodiment of the technology.

FIG. 5A is a rear isometric view of the display mount 400 in a lowered position. FIG. 5B is a detailed view of the portion 5B illustrated in FIG. 5A. FIG. 6A is a front exploded view of the adjustment mechanism 408. Referring now to FIGS. 5B and 6A, the adjustment mechanism 408 includes the tilt bracket 410, a swivel bracket 420, and pivot pins 480. The tilt bracket 410 is pivotally coupled to the swivel bracket 420 via the pivot pins 480 and includes guides 412, illustrated as arched guides, and a plurality of engagement features, illustrated as notches 414 ("notches 414") in FIG. 5B.

The swivel bracket 420 is rotatably coupled to the vertical member 570 of the extender assembly via a swivel rod 424 (see FIG. 7A) configured to allow the swivel bracket 420 to swivel in a generally horizontal direction relative to the extender assembly 528. A lower portion of the swivel bracket 420 is rotatably coupled to a lower portion of the tilt bracket 410 via the pivot pin 480. An upper portion of the swiveling bracket 420 is slidably coupled to the arched guide 412 via tilt cams or pins 416 ("pins 416") such that when the tilt bracket 410 tilts forward (i.e., rotates about the pivot pins 480), the swivel bracket 420 can remain fixed in a vertical orientation.

Referring to FIG. 5B, the pull latch 430 is slidably coupled to the swivel bracket 420 via sliding pins 422 and the biasing elements 440 (one visible in FIG. 5B and two shown in FIG. 6B). An upper portion of the pull latch 430 includes tilt lock members 432 configured to engage the notches 414. For example, the tilt lock members 432 can be configured to fit in notches 414, thereby preventing tilting of the tilt bracket 410 relative to the swivel bracket 420. In some embodiments, the engagement features 414 can be in the form of one or more teeth, indentations, grooves, or features configured to receive the tilt lock members 432. The biasing elements 440 can be configured to bias the pull latch 430 upward when the pull latch 430 is pulled downward (e.g., by a user applying a downward force on the handle 450) to move the tilt lock members 432 out of the notches 414. The biasing elements 440 can bias the pull latch 430 upward such that the tilt lock members 432 are inserted into the notches 414. The biasing elements 440 can bias the tilt lock members 432 upwardly such that tilt lock members 432 are held in respective notches 414, thereby keeping the tilting bracket 410 in a locked configuration or state.

The configuration of the tilt bracket 410 can be selected based on the desired range of motion. For example, the number of notches 414 relates to the number of different tilt angles that the television mounting portion 540 can be set to. The spacing between the notches 414 and the distance between the notches 414 and the pivot pin 480 can be selected based on the tilt angle increments for the television mounting bracket 540.

FIGS. 6A and 6B are front and rear exploded views of the adjustment mechanism 408, respectively. The television mounting bracket 540 is fixedly attached to the tilt bracket 410. The tilt bracket 410 is rotatably coupled to the swivel bracket 420 via the pivot pins 480. The arched guide 412 of the tilt bracket 410 is slidably coupled to the swivel bracket 420 via the tilt pins 416. In some embodiments, the guides 412 can be generally straights, arcuate, or the like. When the television mounting bracket 540 is in the non-tilted position, the tilt bracket 410 and the swivel bracket 420 can be generally flush against each other. The swivel bracket 420 is slidably coupled to the pull latch 430 via the sliding pins 422 and the biasing elements 440. The swivel bracket 420 is also generally flush against the pull latch 430.

The tilt bracket 410 and the swivel bracket 420 each include two apertures or slots 418, 422, respectively, configured to receive tabs of the pull latch 430. The tabs 434 of the pull latch 430 are pivotally coupled to the tilt rods 470. The rods 470 can have a plurality of longitudinal slots for coupling to the tabs 434. The rods 470 can be moved upwardly and downwardly to couple the rods 470 to the tabs 434 at the desired location, thereby setting the vertical position of the handle 450 (FIGS. 2 and 3) based on the size of the television. In some installations, the handle 450 can be positioned adjacent to or immediately below the bottom of the television. The user can then couple the rods 470 to the tabs 434 to maintain the position of the handle 450 with respect to the television.

The configuration of the slots 418, 422 can be selected based on the range of motion of the pull latch 430. The longitudinal lengths of slots 418, 422 can be increased or decreased to increase or decrease, respectively, the length of travel of the pull latch 430. The slots 418, 422 can be longer than the displacement of the tilt lock members 432 (FIG. 5) needed to disengage the notches 414 such that the tilt lock members 432 can be moved into and out of the notches 414.

A handle plate 442 can be coupled to ends 472 of the rods 470. The handle plate 442 can be fixably coupled to a handle (e.g., handle 450 of FIG. 4) via one or more couplers, fasteners, or the like. In some embodiments, the handle plate 442 can have handle tabs 443 rotatably coupled to the ends 472 via pins, fasteners, or the like. The handle plate 442 can include adjustment slots 444 to allow for vertical adjustment of the handle 450. As shown in FIG. 4, fasteners 446 can couple the handle 450 to the handle plate 442.

II. Tilting and Swivel Mechanisms

Figures 7A, 7B:
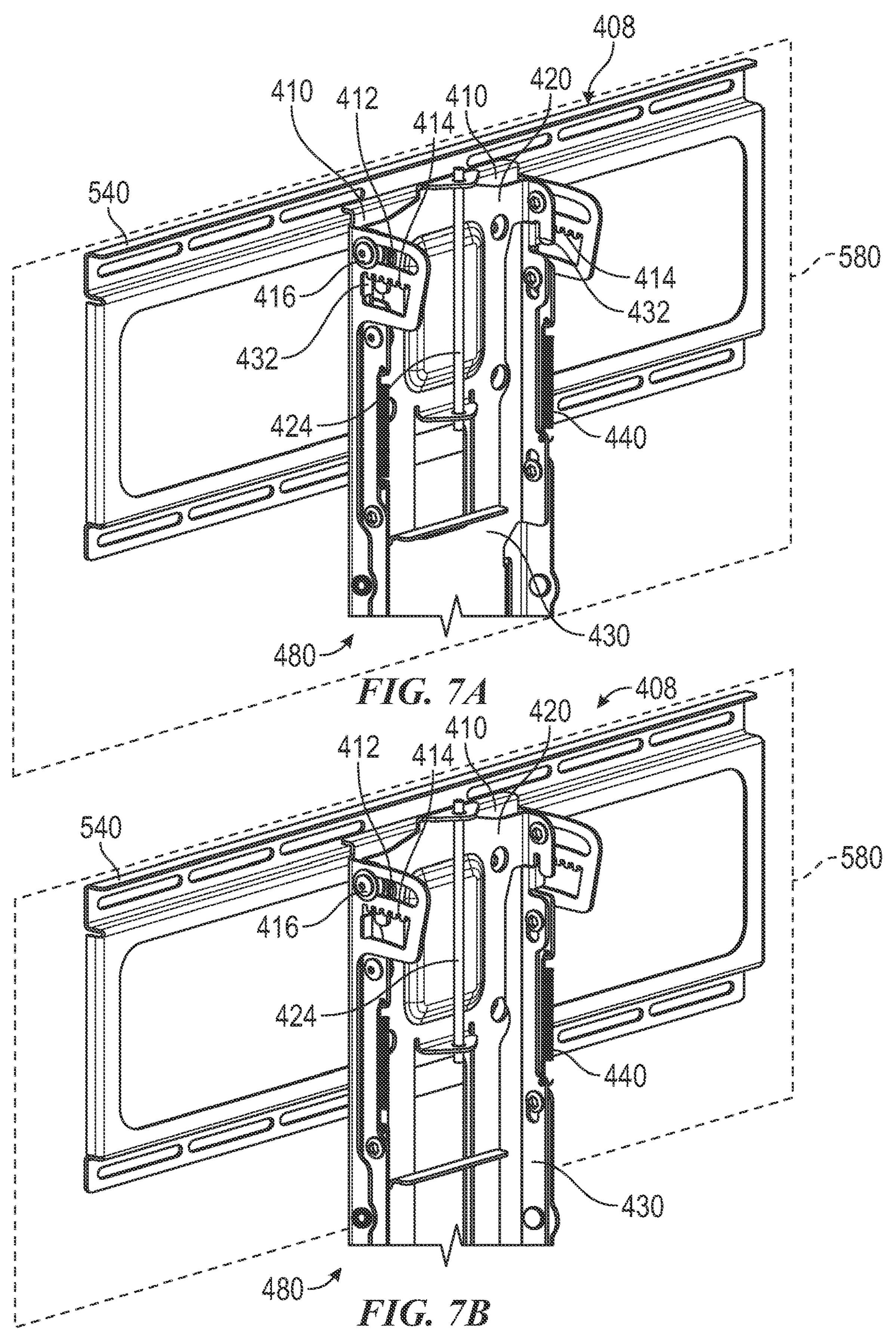
FIG. 7A is a rear isometric view of an adjustment mechanism in a locked state in accordance with an embodiment of the technology.
FIG. 7B illustrates the adjustment mechanism of FIG. 7A in an unlocked state for tilting a television.

FIGS. 7A, 7B, 7C, and 7D illustrate how a television 580 is tilted. FIG. 7A shows the adjustment mechanism 408 in the non-tilted upright position. The tilt lock members 432 are positioned in the forward-most notches 414 (one identified), thereby keeping the tilt bracket 410 in the non-tilted upright locked position. The pull latch 430 is in the locked state (e.g., an upward or non-pulled position). The swivel bracket 420 captively holds the pivot or swivel rod 424, which can be coupled to the extender assembly (e.g., extender assembly 528 of FIG. 4).

FIG. 7B shows the adjustment mechanism 408 in the non-tilted unlocked state. A user may pull on the handle 450 (FIGS. 2 and 3), which is coupled to the pull latch 430 via the tilt rods 470 (FIGS. 6A and 6B), to pull the pull latch 430 in a generally vertical downward direction. The swivel bracket 420 remains fixed relative to the extender assembly (not shown). The tilt lock members 432 of the pull latch 430 are pulled out of the notches 414, as shown in FIG. 7B. The tilt lock members 432 no longer prevent rotation of the tilting bracket 410 about the pivot pin 480. The user can manually rotate the tilt bracket 410 about the pivot pin 480 (FIG. 5B) to a desired tilt angle defined by the notches 414.

Figures 7C, 7D:
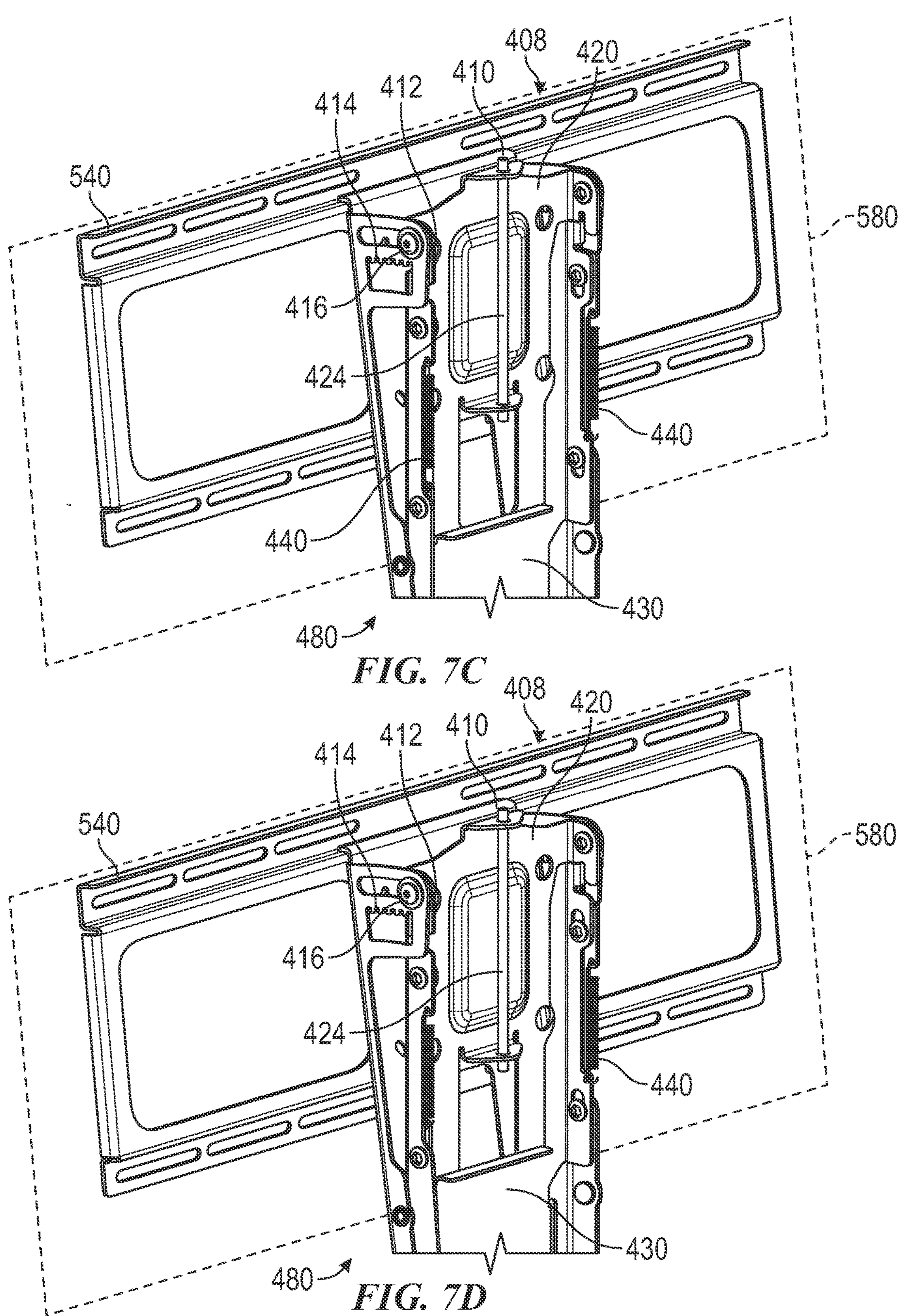
FIG. 7C illustrates the adjustment mechanism in an unlocked state and a television in a forward-tilted position.
FIG. 7D illustrates the adjustment mechanism in a locked state with a television at a forward-tilted position.

FIG. 7C shows the television mounting bracket 540 in a forward-most tilted unlocked state. In some embodiments, the tilt bracket 410 is rotated via an electric-powered driver (e.g., one or more motors) when the user pushes on a button (e.g., a button on the display mount 400, a button on a remote control, etc.). The swiveling bracket 420 can remain fixed relative to the extender assembly (not shown). The biasing element 440 remains under tension that biases the pull latch 430 upward. The user can release or stop pulling on the pull latch 430 such that the pull latch 430 is returned to the original position illustrated in FIG. 7A due to the biasing force provided by the biasing elements 440.

FIG. 7D shows the television mounting bracket 540 in the forward-most tilted, locked position. The tilt lock members 432 are positioned in rearward-most notches 414. The tilt lock members 432 and the notches 414 keep the tilt bracket 410 at the desired tilt angle and prevent rotation until the user actuates the pull latch 430.

The adjustment mechanism 408 can also be installed in a user's pre-existing display mount, such as by re-connecting, removing, and/or replacing certain components. For example, the user can decouple a pre-existing television mounting portion from a pre-existing an extender assembly, then dispose the adjustment mechanism 408 in between.

Figure 9:
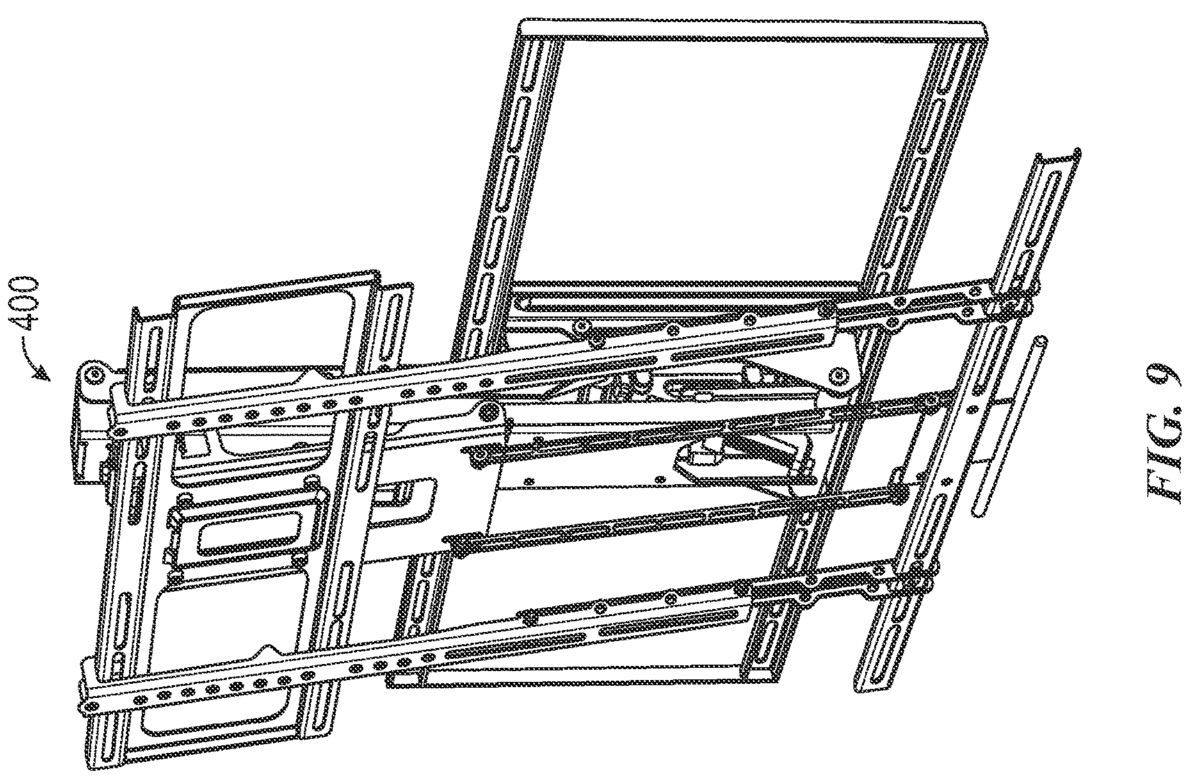
FIGS. 8 and 9 are front isometric views of the collapsed display mount with a television bracket in an upright position and in a downward-tilted position, respectively.
Figure 8:
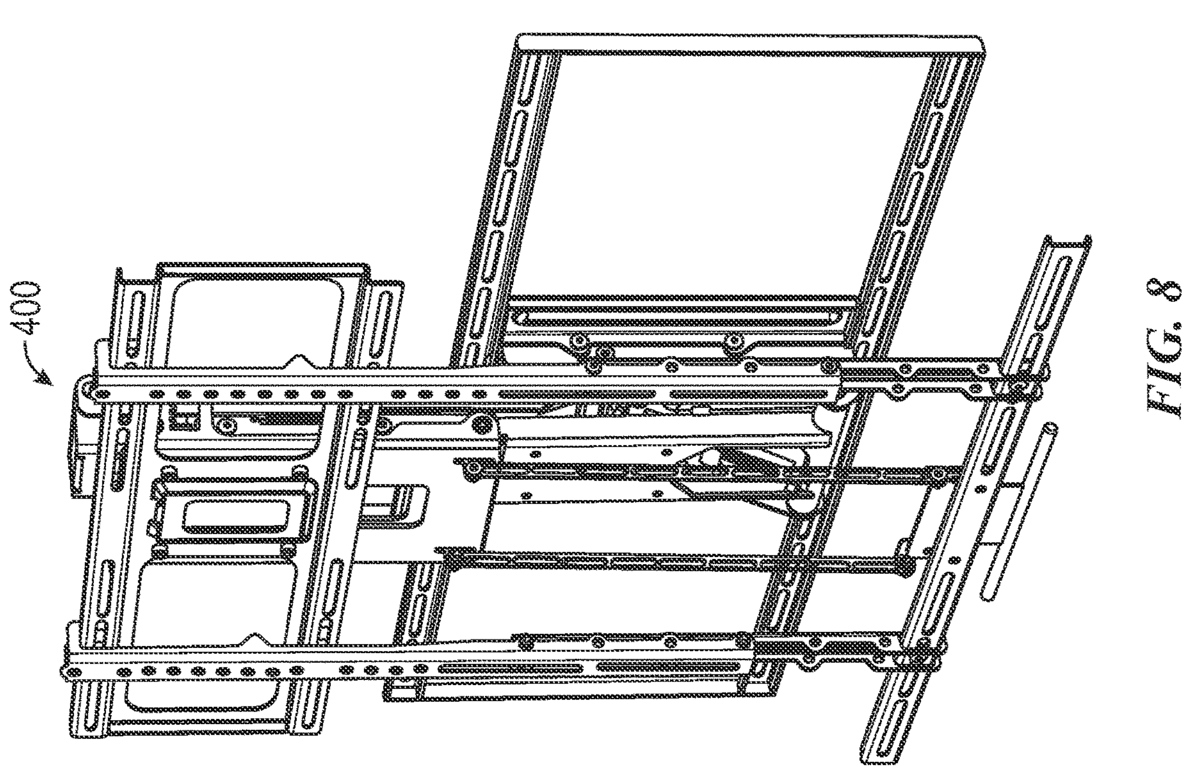
Figure 10:
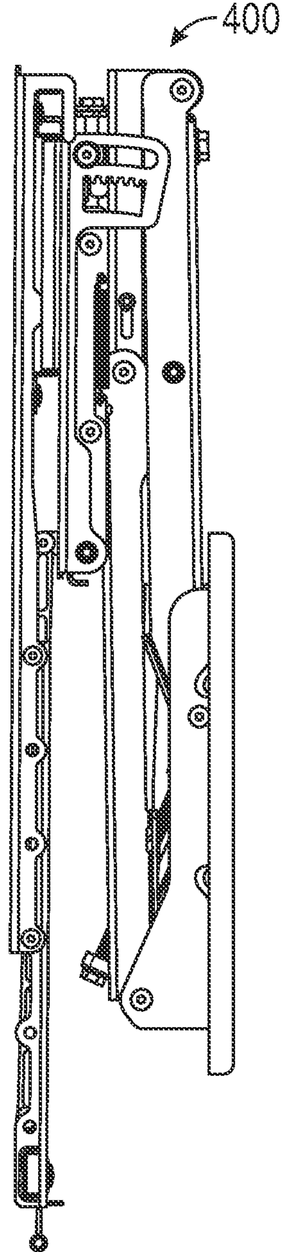
FIGS. 10 and 11 are side views of the collapsed display mount with the television bracket in the upright position and the downward-tilted position, respectively.
Figure 11:
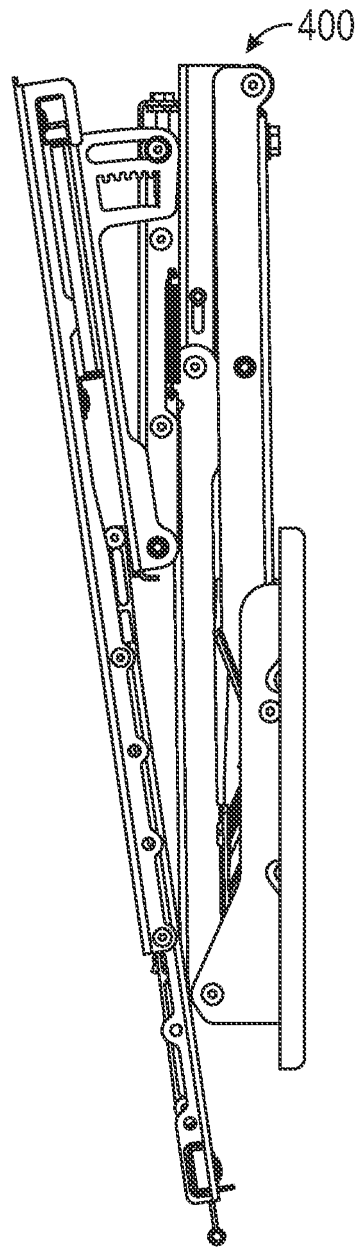
Figure 13:
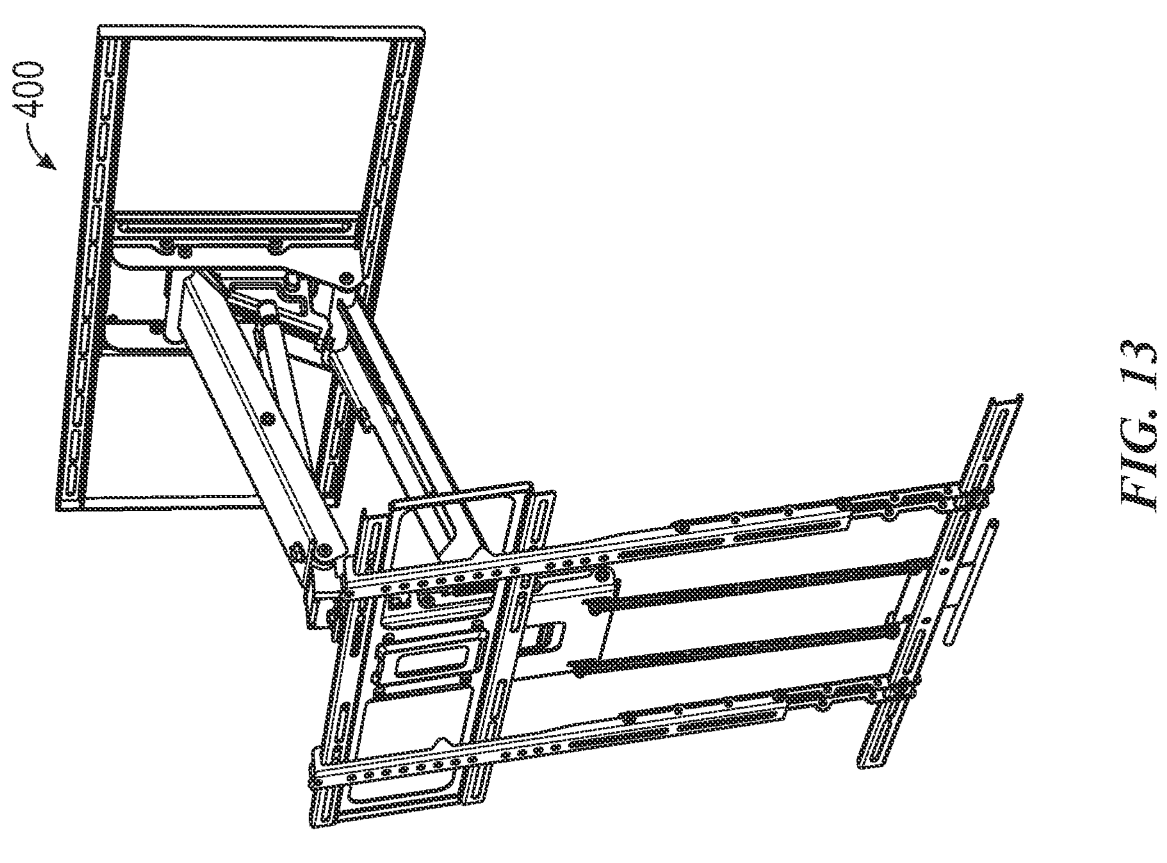
FIGS. 12 and 13 are front isometric views of the display mount with the television in a lowered upright position and in a downward-tilted position, respectively.
Figure 12:
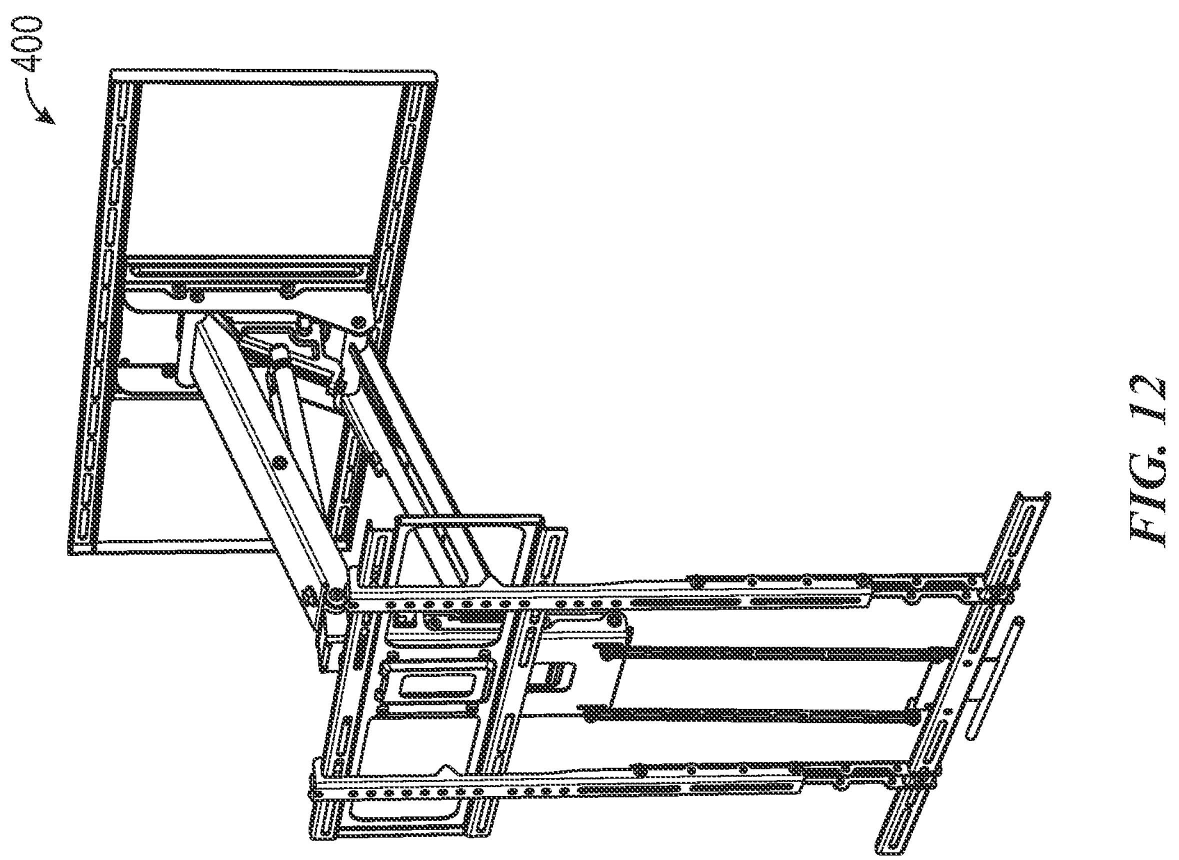
Figure 15:
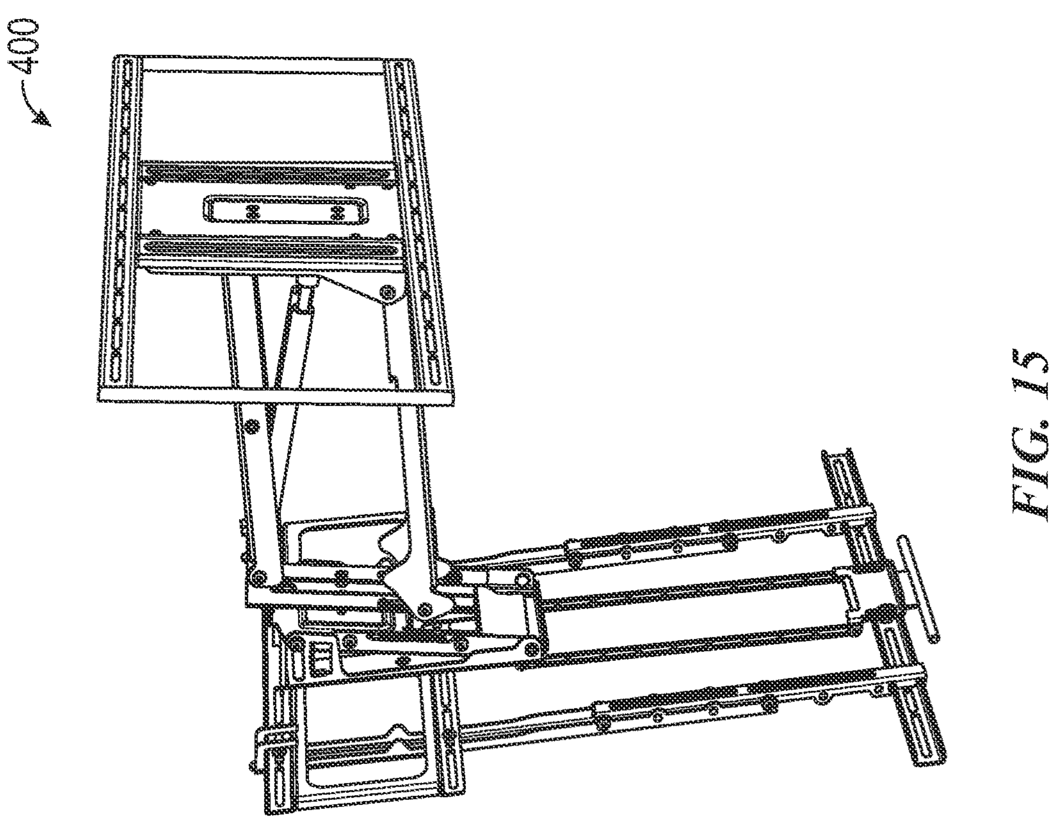
FIGS. 14 and 15 are rear isometric views of the deployed display mount with the television bracket in a lowered upright position and in a lowered downward-tilted position, respectively.
Figure 14:
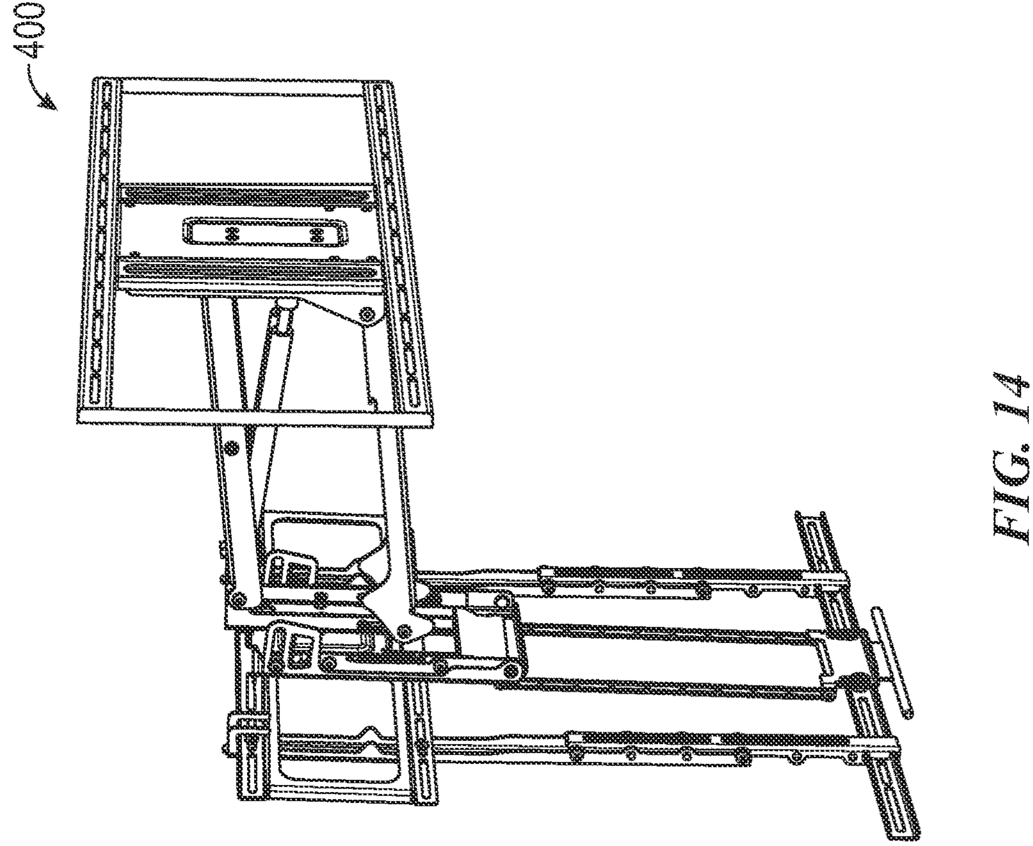
Figure 17:
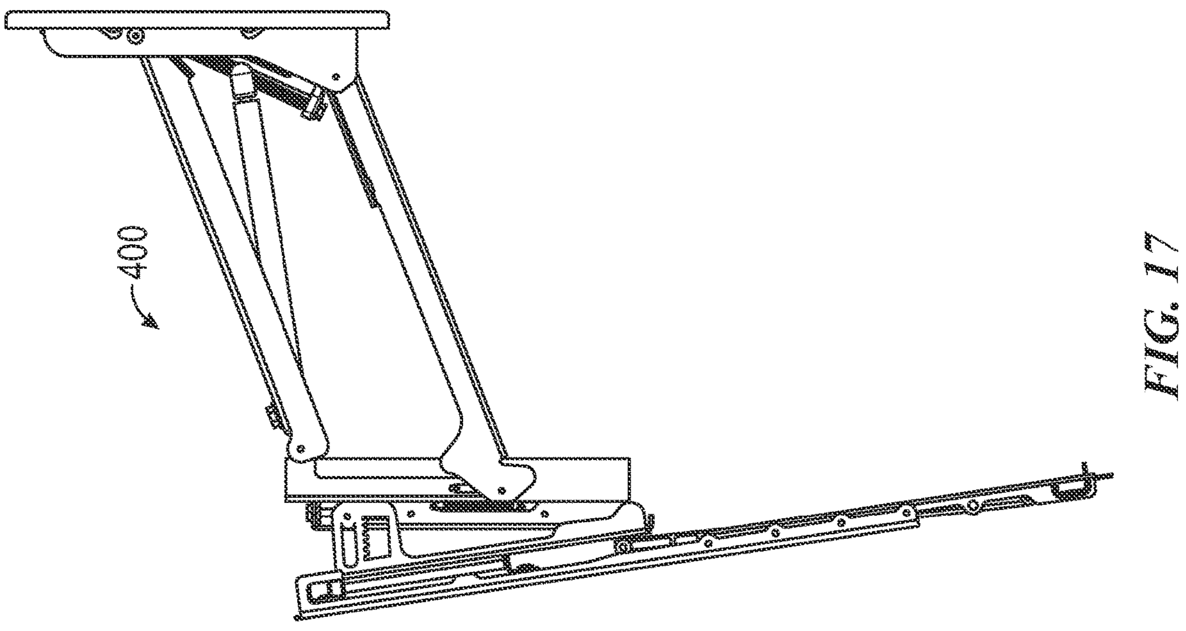
FIGS. 16 and 17 are side views of the display mount with the television bracket in the lowered upright position and the lowered downward-tilted position, respectively.
Figure 16:
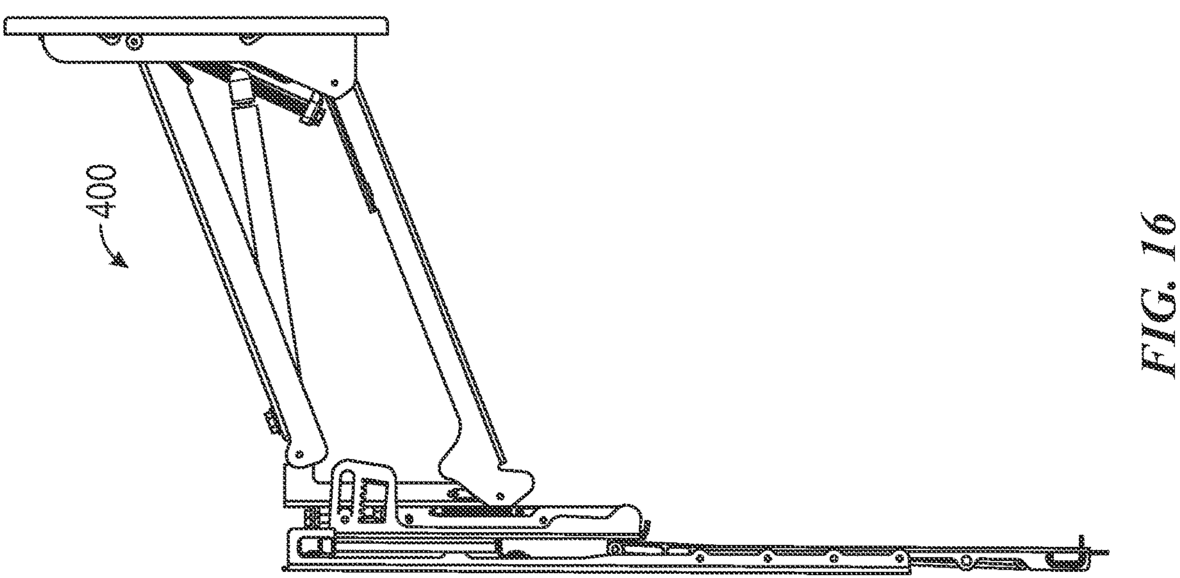

The display mount 400 can be moved to various positions for viewing flexibility. FIGS. 8 and 9 are front isometric views of the stowed display mount 400 in upright and tilted positions, respectively. FIGS. 10 and 11 are side views of the stowed display mount 400 in upright and tilted positions, respectively. FIGS. 12 and 13 are front isometric views of the display mount 400 in forward-lowered-upright position and forward-lowered-tilted positions, respectively. FIGS. 14 and 15 are rear isometric views of the display mount 400 in forward-lowered-upright position and forward-lowered-tilted positions, respectively. FIGS. 16 and 17 are side views of the display mount 400 in forward and forward-tilted positions, respectively.

As shown in FIGS. 8-17, the television mounting bracket 540 can be tilted to a desired tilt angle whether the display mount 400 is in the stowed position or the forward position. The television mounting portion 540 can also be rotated in a generally horizontal direction by rotating the swiveling bracket 420 about the swivel rod 424 whether the display mount 400 is in the stowed position or the forward position. As shown in FIGS. 8-17, the extender assembly can be configured to keep the vertical member 570 in the same vertical orientation whether the display mount 400 is in the stowed position or the forward lowered position. This preserves the set tilt angle of the tilting bracket 410 when the display mount 400 is switched between the stowed and forward positions. In some embodiments, the extender assembly can be configured to change the orientation of the vertical member 570 when switching the display mount 400 between the stowed and forward positions. This may be advantageous when the desired tilt angle is different depending on whether the display mount 400 is in the stowed or forward position.

III. Related Patents and Applications

Additional apparatuses, components, controllers, software, methods of operation, methods for manufacturing, and other features are disclosed in the following patents and applications: U.S. Patent Application No. 61/396,850; U.S. Patent Application No. 63/435,499; U.S. Patent Application No. 61/913,195; U.S. patent application Ser. No. 16/033,972; U.S. patent application Ser. No. 16/370,854; U.S. patent application Ser. No. 16/924,551; U.S. patent application Ser. No. 17/026,088; U.S. patent application Ser. No. 17/840,174; U.S. patent application Ser. No. 16/375,835; U.S. patent application Ser. No. 17/090,701; U.S. Patent Application No. 62/553,961; U.S. Pat. No. 10,738,941; U.S. patent application Ser. No. 16/918,718; U.S. patent application Ser. No. 17/876,950; International Application No. PCT/US21/17141; International Application No. PCT US20/66196; U.S. Patent Application No. 62/950,524; U.S. Patent Application No. 62/972,643; U.S. Patent Application No. 62/971,974; and U.S. Pat. Nos. 8,724,037; 8,864,092; 8,724,037; 9,625,091; 9,876,984; 10,257,460; 10,281,080; 10,277,860; 10,257,460; 10,935,180; 10,859,201; 10,738,941; 11,287,080; 11,346,496; 11,802,653; and 11,668,434. For example, linkage assemblies, motors, actuators, cam mechanisms, tilting features, pivot features, arms, gas springs, spring blocks, calibration screws, adjustment screws, adjustment collars, panning features, counterbalancing features, controllers, motors, etc., can be incorporated into mounts, arms, support brackets, display brackets, or other components disclosed herein. Additionally, the components and features disclosed herein can be incorporated into four-bar linkages, five-bar linkages, and other mounts or systems disclosed in applications or patents incorporated by reference. The systems and devices can be installed at different positions and orientations to move displays (e.g., monitors, televisions, etc.) to desired positions. All patents, applications, and other references cited herein are hereby incorporated by reference in their entirety. Any and all priority claims identified in the Application Data Sheet, or any correction thereto, are also hereby incorporated by reference in their entirety.

Reference throughout this specification to "one embodiment" or "an embodiment" means that a particular feature, structure, or characteristic described in connection with the embodiment is included in at least one embodiment of the present invention. Thus, the occurrences of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the claimed invention.

From the foregoing, it will be appreciated that specific embodiments of the invention have been described herein for purposes of illustration, but that various modifications may be made without deviating from the scope of the invention. Accordingly, the invention is not limited except as by the appended claims.

What is claimed is:

1. A television tilt device, comprising:

a tilt latch mechanism couplable to a television mounting bracket and a wall mount, wherein the tilt latch mechanism includes a plurality of notches and a tilt-fixing portion configured to fit into one of the plurality of notches;

a handle; and a linkage coupling the handle to the tilt latch mechanism such that the handle is positioned below the television mounting bracket, and wherein the handle is movable from (i) a locked position in which the tilt-fixing portion is engaged with one of the plurality of notches to (ii) an unlocked position in which the tilt-fixing portion is disengaged from the plurality of notches to unlock the tilt latch mechanism so as to allow the handle to be moved toward and away from the wall mount to tilt the television mounting bracket.

2. The television tilt device of claim 1, wherein the linkage is extendable to position the handle below a television that is mounted on to the television mounting bracket.

3. The television tilt device of claim 1, wherein the tilt latch mechanism includes:

a tilt bracket fixedly attached to the television mounting bracket;

a mount bracket coupled to the wall mount; and a pull latch slidably coupled to the mount bracket and configured to engage the tilt bracket to lock the tilt latch mechanism and to disengage the tilt bracket to unlock the tilt latch mechanism.

4. The television tilt device of claim 1, further comprising a swivel device coupled to the wall mount and configured to allow the television mounting bracket to swivel relative to the wall mount.

5. The television tilt device of claim 1, wherein the tilt latch mechanism has a locked configuration and an unlocked configuration and includes one or more springs configured to bias the tilt latch mechanism toward a locked configuration, wherein the handle is vertically movable relative to the tilt latch mechanism to cause the tilt latch mechanism to change from the locked configuration to the unlocked configuration, and wherein the handle is horizontally movable to adjust tilt of the television mounting bracket while the tilt latch mechanism is in the unlocked configuration.

6. The television tilt device of claim 1, wherein the tilt latch mechanism is lockable at a plurality of discrete positions for holding the television mounting bracket at respective angles of tilt.

7. The television tilt device of claim 1, wherein the tilt latch mechanism is lockable at a plurality of angular tilt positions.

8. The television tilt device of claim 1, wherein the tilt latch mechanism has a locked configuration that prevents tilting of the television mounting bracket and an unlocked configuration for adjusting tilt of the television mounting bracket.

9. The television tilt device of claim 1, wherein the linkage is extendable/contractable to lower and raise the handle while the wall mount is coupled to a vertical wall.

10. The television tilt device of claim 1, wherein the wall mount includes:

a four-bar linkage mount, a five-bar linkage mount, or an extender assembly; and a wall mounting bracket configured to be coupled to a vertical wall.

11. A television tilt and swivel device, comprising:

a television mounting bracket;

a tilt bracket fixedly attached to the television mounting bracket and having an arched guide and a plurality of notches;

a swivel rod;

a swivel bracket rotatably coupled to an extender assembly via the swivel rod to allow the swivel bracket to swivel in a generally horizontal direction relative to the extender assembly, wherein a lower portion of the swivel bracket is rotatably coupled to a lower portion of the tilt bracket, and wherein an upper portion of the swivel bracket is slidably coupled to the arched guide;

a pull latch slidably coupled to the swivel bracket and having a tilt-fixing member configured to fit into one of the plurality of notches to prevent rotation of the tilt bracket relative to the swivel bracket; and at least one biasing element coupled to the swivel bracket and the pull latch, wherein the at least one biasing element is configured to bias the tilt-fixing member toward the plurality of notches.

12. The television tilt and swivel device of claim 11, further comprising a handle coupled to the pull latch and configured to be pulled by a user to unlock the television tilt and swivel device.

13. The television tilt and swivel device of claim 12, further comprising a tilt rod coupled to the handle and the pull latch.

14. The television tilt and swivel device of claim 11, wherein the swivel bracket comprises a vertical guide portion configured to vertically guide the tilt-fixing member into and out of one of the plurality of notches.

15. The television tilt and swivel device of claim 11, wherein the pull latch is slidably coupled to the swivel bracket in a generally vertical direction when the television mounting bracket holds a television at a vertical orientation, and wherein the at least one biasing element is oriented in the generally vertical direction.

16. The television tilt and swivel device of claim 11, wherein the at least one biasing element includes a plurality of springs.

17. The television tilt and swivel device of claim 11, wherein the swivel bracket comprises a first aperture and a second aperture, wherein the first and second apertures are configured to couple to the swivel rod.

18. An adjustable actuating handle assembly, comprising:

a handle;

a tilt pull latch coupled to the handle and having a tilt-fixing portion;

a swivel bracket slidably coupled to the tilt pull latch;

a biasing element; and a tilting plate having an arched guide and a plurality of notches, wherein a lower portion of the tilting plate is rotatably coupled to a lower portion of the swivel bracket, and wherein an upper portion of the arched guide is slidably coupled to the swivel bracket, wherein the tilt-fixing portion is configured to fit into one of the plurality of notches and prevent rotation of the tilting plate, and wherein the biasing element is configured to bias the tilt-fixing portion toward the plurality of notches.

19. The adjustable actuating handle assembly of claim 18, further comprising a tilt rod configured to couple a lower portion of the tilt pull latch to the handle.

20. A method of installing a television tilt and swivel device, comprising:

disposing the television tilt and swivel device between a television mounting portion and an extender assembly, wherein the television tilt and swivel device comprises:

a tilting portion having an arched guide and a plurality of notches;

a swiveling portion, wherein a lower portion of the swiveling portion is rotatably coupled to a lower portion of the tilting portion, and wherein an upper portion of the swiveling portion is slidably coupled to the arched guide;

a pulling portion slidably coupled to the swiveling portion and having a tilt-fixing portion configured to fit into one of the plurality of notches and prevent rotation of the tilting portion; and a biasing element coupled to the swiveling portion and the pulling portion, wherein the biasing element is configured to bias the tilt-fixing portion toward the plurality of notches;

coupling the tilting portion to the television mounting portion; and rotatably coupling the swiveling portion to the extender assembly via a swivel rod configured to allow the swiveling portion to swivel in a generally horizontal direction relative to the extender assembly.

21. The method of claim 20, further comprising:

decoupling a connecting element from both the television mounting portion and the extender assembly; and removing the connecting element.

22. The method of claim 20, wherein the television tilt and swivel device further comprises a handle coupled to the pulling portion.

23. The method of claim 22, further comprising:

adjusting a tilt angle of the television mounting portion by— pulling the handle in a downward direction until the tilt-fixing portion is decoupled from the plurality of notches;

tilting the television mounting portion to a desired tilt angle; and releasing the handle such that the biasing element pulls the pulling portion in an upward direction and the tilt-fixing portion is fitted into one of the plurality of notches.

24. The method of claim 22, further comprising:

adjusting a swivel angle of the television mounting portion by rotating the handle around an axis defined by the swivel rod.

25. A television mount, comprising:

a wall mount;

a television mounting bracket configured to couple to a television;

a linkage assembly rotatably coupled to the wall mount and carrying the television mounting bracket;

a tilt bracket coupled to the television mounting bracket and having an opening and a plurality of notches; and a tilt-lock member configured to be positioned in the opening, wherein the tilt-lock member is movable between a locked position at which at least a portion of the tilt-lock member fits in at least one of the plurality of notches to prevent rotation of the tilt bracket relative to the linkage assembly, and an unlocked position at which the tilt-lock member is disengaged from the plurality of notches to allow rotation of the television mounting bracket relative to the linkage assembly.

26. The television mount of claim 25, wherein the tilt bracket includes an arched guide having the opening and a plurality of notches.

27. The television mount of claim 25, further comprising a pin carried by the linkage assembly, and wherein the tilt bracket is movable along the pin to reposition the tilt-lock member along the plurality of notches.

28. The television mount of claim 25, wherein the tilt bracket includes a pair of vertical plates, wherein one of the vertical plates includes the opening and the plurality of notches, and wherein the linkage assembly is movable between the pair of plates when the television mount moves to a raised configuration.

29. The television mount of claim 25, wherein a portion of the tilt bracket extends away from an upper horizontal rail of the television mounting bracket and is positionable alongside a portion of the linkage assembly when the linkage assembly is in a raised configuration.

30. The television mount of claim 25, further comprising a handle coupled to and positioned below the television mounting bracket, and wherein the handle and the television mounting bracket are rotatable about an axis of rotation to adjust tilt of the television mounting bracket when the tilt-lock member is in the unlocked position.

* * * * *